US006856338B2

(12) United States Patent
Takahashi et al.

(10) Patent No.: US 6,856,338 B2
(45) Date of Patent: Feb. 15, 2005

(54) IMAGE FORMING APPARATUS

(75) Inventors: Masayoshi Takahashi, Shizuoka (JP);
Tomohiro Nakamori, Kanagawa (JP);
Yoshihiko Tanaka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/636,686

(22) Filed: Aug. 8, 2003

(65) Prior Publication Data
US 2004/0037584 A1 Feb. 26, 2004

(30) Foreign Application Priority Data

Aug. 23, 2002 (JP) ........................................ 2002-243016

(51) Int. Cl.⁷ ................................................ B41J 2/47
(52) U.S. Cl. ...................... 347/225; 347/237; 347/261; 399/216
(58) Field of Search ................................ 347/115, 116, 347/134, 137, 224, 225, 232, 233, 241, 248, 238, 261; 359/301, 196, 216, 204; 358/505, 510, 534

(56) References Cited

U.S. PATENT DOCUMENTS

| | | | | |
|---|---|---|---|---|
| 4,591,903 A | | 5/1986 | Kawamura et al. ............ 358/75 |
| 4,916,547 A | * | 4/1990 | Katsumata et al. .......... 358/300 |
| 4,924,320 A | * | 5/1990 | Tanaka et al. ............... 358/296 |
| 5,138,479 A | * | 8/1992 | Ando .......................... 359/216 |
| 5,850,306 A | * | 12/1998 | Fukutome et al. ........... 359/204 |
| 6,038,051 A | * | 3/2000 | Suzuki et al. ................ 359/204 |
| 6,064,419 A | * | 5/2000 | Uchiyama .................... 347/250 |
| 6,134,022 A | * | 10/2000 | Yamamoto .................... 358/1.9 |
| 6,493,010 B1 | * | 12/2002 | Takahashi et al. ........... 347/116 |
| 6,654,041 B2 | * | 11/2003 | Takesue ....................... 347/234 |
| 2002/0135822 A1 | * | 9/2002 | Morita ......................... 358/505 |

FOREIGN PATENT DOCUMENTS

| | | |
|---|---|---|
| JP | 4-51829 | 8/1992 |
| JP | 4-313776 | 11/1992 |

* cited by examiner

Primary Examiner—Eugene H. Eickholt
(74) Attorney, Agent, or Firm—Fitzpatrick, Cella, Harper & Scinto

(57) ABSTRACT

This invention has as its object to provide an image forming apparatus in which the number of beam detectors is decreased and which is low in cost and high in the accuracy of the registration position of an image of each color as well as high in quality. To this end, The image forming apparatus is provided with a plurality of image bearing members, an optical system having a plurality of light emitting elements suitable for generating light beams for scanning the image bearing members, a single polygon mirror suitable for deflecting the light beams generated from the plurality of light emitting elements onto the image bearing members, and a beam detector corresponding to at least one of the plurality of image bearing members, and for receiving the light beams scanned by the polygon mirror and producing a first synchronizing signal for recording an image on the relevant image bearing member, a storing portion suitable for storing therein information regarding the error of each side of the polygon mirror, and a producing unit suitable for producing a second synchronizing signal for recording an image on the image bearing member not provided with the beam detector, by delaying the first synchronizing signal outputted from the beam detector, on the basis of the value of the storing portion.

12 Claims, 18 Drawing Sheets

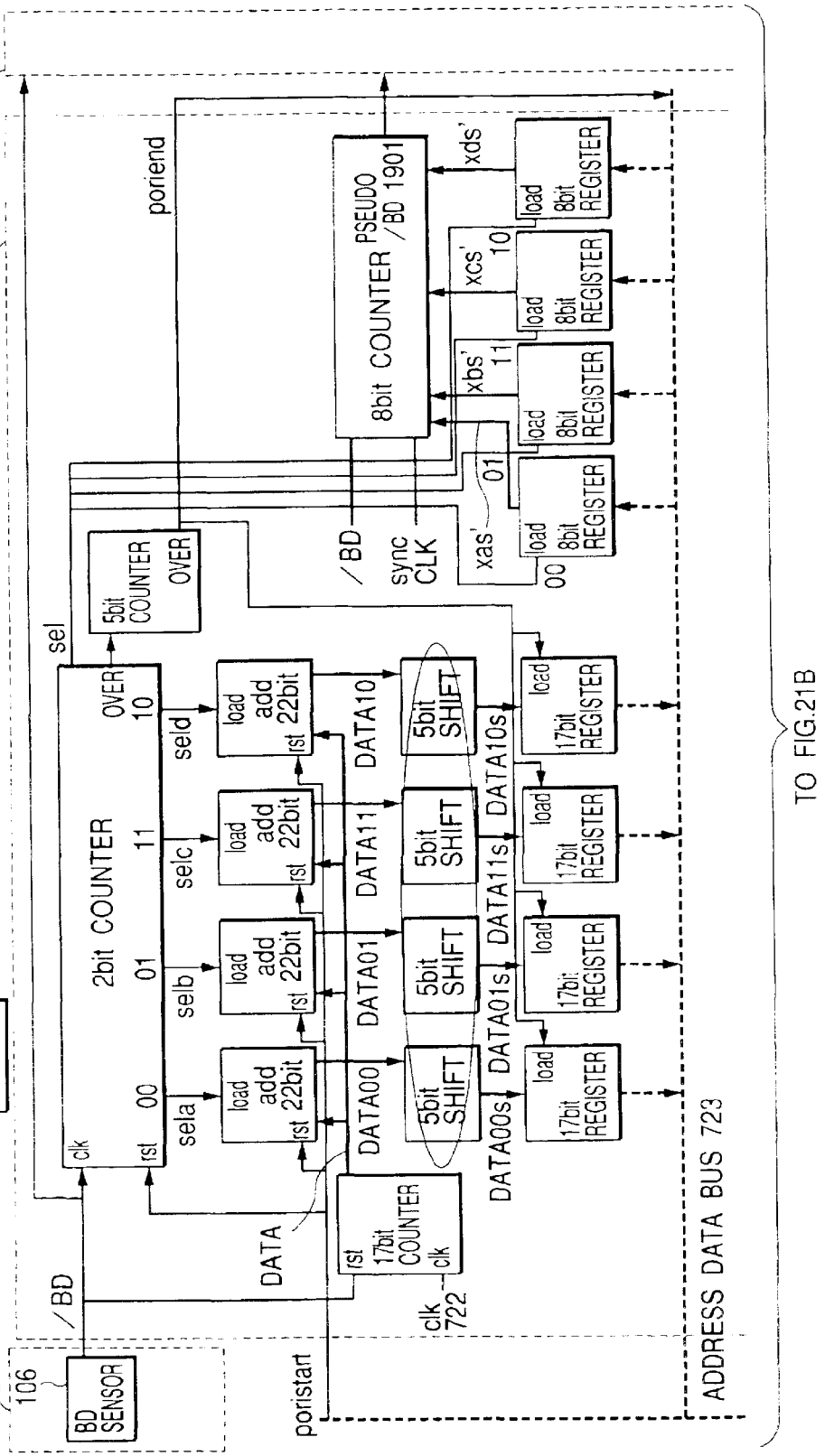

IMAGE FORMING APPARATUS

BACKGROUND OF THE INVENTION

1. Field of the Invention

This invention relates to an image forming apparatus using an electrophotographic process, and particularly to a color image forming apparatus for forming different color images by the use of a plurality of laser beams.

2. Related Background Art

In an image forming apparatus using an electrophotographic process, a laser beam modulated by an image signal is reflected by a scanner having a rotating polygon mirror (hereinafter sometimes abbreviated as the polygon), and scans on a photosensitive member to thereby effect image forming. As the photosensitive member, use is often made of a drum-shaped one which is called a photosensitive drum. When this process is applied to a color laser printer, a plurality of images of different colors, e.g. yellow (Y), magenta (M), cyan (C) and black (BK) are superimposed one upon another to thereby form a color image on a sheet-like medium. Constructions for achieving this superimposing technique include the following:

As a construction, a first color image signal is scanned on the photosensitive drum to thereby form a latent image, and a developer is caused to adhere to the latent image to visualize it, and this visualized image is transferred to recording paper, whereafter the photosensitive drum is cleaned, and a second color image signal is scanned on the same photosensitive drum to thereby form a latent image, and a step similar to that for the first color image is carried out. In this case, however, a second color developer is used as the developer. The same process is repeated also for a third color image signal and a fourth color image signal. In this manner, the images developed a plurality of times are superimposed on the same recording paper to thereby effect the recording of an image.

In another construction, for a plurality of image signals, there are provided the same number of photosensitive drums, and latent images are formed on the photosensitive drums corresponding at one to one to respective color image signals, and visualizing and developing by developers of different colors is effected on the latent images, and the developed images are successively transferred to recording paper. In this case, it is usual to prepare a laser, a scanner, a beam detect (BD) sensor for detecting the image writing-out timing of the laser, and a photosensitive drum for an image signal, and accordingly, when there are a plurality of image signals to be superimposed one upon another, the same number of lasers, scanners, photosensitive drums and BD sensors are necessary.

In the aforedescribed first construction, a series of electrophotographic processes of electrification-exposing-developing-cleaning must be carried out for the first color image signal, and then the same processes must be again carried out for the second color image signal, and the same processes must also be time-serially carried out for the third color image signal and the fourth color image signal. Accordingly, this leads to the disadvantage that the printing timing for a sheet is very long.

The aforedescribed second construction has the merit that printing can be accomplished within a short time in contrast with the first construction. As previously described, however, the same number of lasers, scanners, photosensitive drums and BD sensors as the number of the color image signals must be prepared, and this leads to the disadvantage that the image forming apparatus becomes bulky and costly.

In both of these constructions, the images of respective colors are superimposed one upon another and therefore, so-called color misregister occurring due to the positions of the images of respective colors not coinciding with one another is liable to be caused. Particularly in the latter construction, the images of respective colors are formed by the use of the photosensitive drums, and this leads to the problem that the registration of each color is difficult to accomplish. Therefore, the adjustment of registration is effected for each color. For example, use is made of means for forming a pattern image for registration detection on an intermediate transfer belt (hereinafter abbreviated as ITB) or an electrostatic transportation belt (hereinafter referred to as ETB), and reading it by a registration detecting sensor, and feeding back it to an image writing-out position or the like to thereby effect correction.

The registration detecting sensor applies the image pattern for registration detection formed on the ITB or the ETB by a light source, reading reflected light by a focused light receiving sensor, and electrically processes a variation in the intensity with time of the signal of the light receiving sensor when the image pattern for registration detection has passed as positional deviation information.

Usually, the shortening of the printing time of the laser printer is effected by increasing the rotational speed of the scanner. The rotational speed of the conventional scanner of the laser printer is usually as high as 20000 rpm or greater. Further, the mirror used as the scanner is a polygon mirror, and the error of a deflection angle causes the fluctuation of a position on the photosensitive drum by the optical path length of a laser beam and therefore, the scanner need be very small in the inclination error of each side thereof, and it is also necessary for the vibration thereof by the high-speed rotation thereof to be small. Accordingly, a motor for the scanner becomes bulky in order to obtain the stable high-speed rotation of the polygon mirror, and since the limitation of the inclination error of each side of the mirror is necessary, a precise working technique is required of the scanner manufacturing process. Therefore, the yield of the manufacture is bad and this leads to a very high cost.

An apparatus having a plurality of such scanners as described above becomes bulky and costly.

So, in order to achieve a reduction in cost, there have been devised an apparatus using a common scanner for a plurality of colors (Japanese Patent Application Post-Exam Publn No. 4-51829), and further an apparatus in which a scanner is made common and a BD sensor is provided for only one of a plurality of light sources (Japanese Patent Application Laid-Open No. 4-313776). Briefly describing Japanese Patent Application Laid-Open No. 4-313776, the plurality of light sources are designed such that photosensitive members are scanned at a time by the different sides of the polygon, and the other light sources than the light source provided with the BD sensor can be presumed from the BD signal of the light source provided with the BD sensor because the rotation phase difference (angle difference) of the polygon is known in advance.

Of the above-mentioned publications, in Japanese Patent Application Post-Exam Publn No. 4-51829, use is made of a common polygon mirror and a common scanner motor. The BD sensor, however, must be prepared for each color and therefore, a corresponding increase in cost is unavoidable.

Also, in Japanese Patent Application Laid-Open No. 4-313776, a single BD sensor is used and therefore, a reduction in cost can be realized. However, the BD of the light sources without the BD sensor premises that the rotation phase difference, i.e., the surface division accuracy, of the polygon is accurate. That is, since the rotation phase difference is known in advance, the scanning position of the laser without the BD sensor can be known from the BD signal of the laser having the BD sensor.

An example of the apparatus using a common scanner for a plurality of colors will now be described with reference to FIGS. 15 and 16 of the accompanying drawings. In FIG. 15, a BD sensor 106 exists on the scanning path of LD1 (101). Usually, if a BD signal from the BD sensor 106 is BD1, an image is written out after predetermined timing (e.g.tc) from BD1 as indicated by 1601 and 1602 in FIG. 16, whereby an image is formed at a proper position. On the other hand, if a BD sensor 106 also exists on the scanning path of LD2 (102), an image is written out after tc from BD2 a BD signal from a BD sensor 701 is defined as BD2) as indicated by 1603 and 1604 also in FIG. 16, whereby an image is formed on a proper position.

If two lasers 101 and 102 are at entirely symmetrical positions and a polygon mirror 103 is a square have an entirely ideal angle of 90 degrees, the BD sensors 106 and 701 output BD signals at entirely the same timing and thus, only one of the BD sensors 106 can be utilized.

In reality, however, it is impossible to equalize the side division accuracy of all mirror sides of the polygon mirror, and as shown in FIG. 12 of the accompanying drawings, there always exists an error. ($\alpha$ is usually an angle of the order of several tens to several hundreds of seconds.)

What the BD period when such a polygon mirror is used will become like will now be described. The positions of the respective sides of such a polygon 103 as shown in FIG. 15 are defined as (1) to (4), and the period of the BD signal when a laser beam outputted from the laser 101 is reflected by the polygon 103 and is incident on the BD sensor 106 is measured each time. FIG. 13 of the accompanying drawings is a graph in which the BD period is plotted. In FIG. 13, t1-2 indicates the time from after BD has been detected by the side (1) of the polygon until BD is detected by the side (2), and t2-3, t3-4 and t4-1 are similar in significance. $\Delta$t1 indicates the difference between t1-2 and an average BD period (a quarter of one full rotation), and $\Delta$t2, $\Delta$t3 and $\Delta$t4 are similar in significance. FIG. 14 of the accompanying drawings represents this state with time as the axis of abscissas. With the BD detected by the side (1) of the polygon as the reference, the upper side is the BD period in the case of an ideal polygon mirror, and the lower side is the BD period of the actual polygon mirror. t1-2 is shorter in period by $\Delta$t1 relative to an ideal BD period. t2-3 is longer in period by $\Delta$t2 relative to the ideal BD period. The error cumulates and becomes $\Delta$t1+$\Delta$t2. ($\Delta$t1 is negative and $\Delta$t2 is positive.) In this manner, when the polygon makes one round, the error cumulates and becomes $\Delta$t1+$\Delta$t2+$\Delta$t3+$\Delta$t4. This becomes equal to zero. What has been described above is the characteristic of the BD period when the actual polygon mirror is used.

Usually, design is made such that BD is detected without fail by each side of the polygon each time and therefore, the error of each side of the polygon does not affect and it never happens that the image writing-out position deviates. However, when as shown in FIG. 15, there is adopted a construction in which two lasers are scanned at a time by a polygon and a BD sensor is disposed only for one laser and the BD detection of the other laser is done from the BD signal of the laser for which the BD sensor is provided, the deviation of the BD period of each surface as shown in FIGS. 13 and 14 affects, and since the scanning surface of the laser having BD and the scanning surface of the laser without BD differ from each other, the image writing-out timing of the laser without BD does not coincide with that of the other laser, and this appears as the deviation of the writing-out position. To avoid this, the side division error of the polygon can be increased to the limit. However, to increase the side division error of the polygon mirror, a high degree of precise working technique becomes indispensable. This becomes bad in the yield of manufacture and very costly.

SUMMARY OF THE INVENTION

The present invention has been made in order to solve the above-noted problem peculiar to the prior art, and an object thereof is to provide an image forming apparatus in which the number of BD sensors is decreased and which is low in cost and high in the accuracy of the image registration position of each color as well as high in quality.

An image forming apparatus according to the present invention is characterized by:

a plurality of image bearing members;

an optical system having a plurality of light emitting elements suitable for generating light beams for scanning the image bearing members, a single polygon mirror suitable for deflecting the light beams generated from the plurality of light emitting elements onto the image bearing members, and a beam detector corresponding to at least one of the plurality of image bearing members, and for receiving the light beams scanned by the polygon mirror and producing a first synchronizing signal for recording an image on the relevant image bearing member;

a storing portion suitable for storing therein information regarding the error of each side of the polygon mirror; and a producing unit suitable for producing a second synchronizing signal for recording an image on the image bearing member not provided with the beam detector, by delaying the first synchronizing signal outputted from the beam detector, on the basis of the value of the storing portion.

In the above-described image forming apparatus, the storing portion stores therein an amount of delay for each side of the polygon mirror.

The above-described image forming apparatus is further characterized by a calculating portion suitable for calculating the aforementioned amount of delay by measuring the interval of the first synchronizing signal produced by the beam detector.

In the above-described image forming apparatus, there exists a light beam scanned n sides before a side corresponding to the beam detector, and the calculating portion calculates the aforementioned amount of delay by measuring the interval of the first synchronizing signal n sides after the first synchronizing signal.

In the above-described image forming apparatus, the calculating portion calculates the aforementioned amount of delay by calculating the difference between the interval of the synchronizing signal on each side and the minimum value of the interval.

In the above-described image forming apparatus, the calculating portion executes the aforementioned measuring operation a plurality of times, and calculates the aforementioned amount of delay on the basis of the average value of those measurement values.

In the above-described image forming apparatus, when the difference between the maximum value and minimum value of the value calculated by the calculating portion is greater than a predetermined value, the calculation by the calculating portion is executed again.

The above-described image forming apparatus has a plurality of optical systems, and superimposes images of a plurality of colors one upon another to thereby form a color image.

The above-described image forming apparatus has four image bearing members and two optical systems, and each of the optical systems forms images of two colors.

The above-described image forming apparatus has four image bearing members and an optical system, and the optical system scans images of four colors.

In the above-described image forming apparatus, there is provided a beam detector corresponding to the image bearing member for forming a black toner image.

In the above-described image forming apparatus, there is not provided a beam detector corresponding to the image bearing member for forming a yellow toner image.

Other objects, constructions and effects of the present invention will become apparent from the following detailed description and the accompanying drawings.

DETAILED DESCRIPTION OF THE PREFERRED EMBODIMENTS

First Embodiment

A first embodiment of the present invention will hereinafter be described with reference to the drawings.

Figure 3:
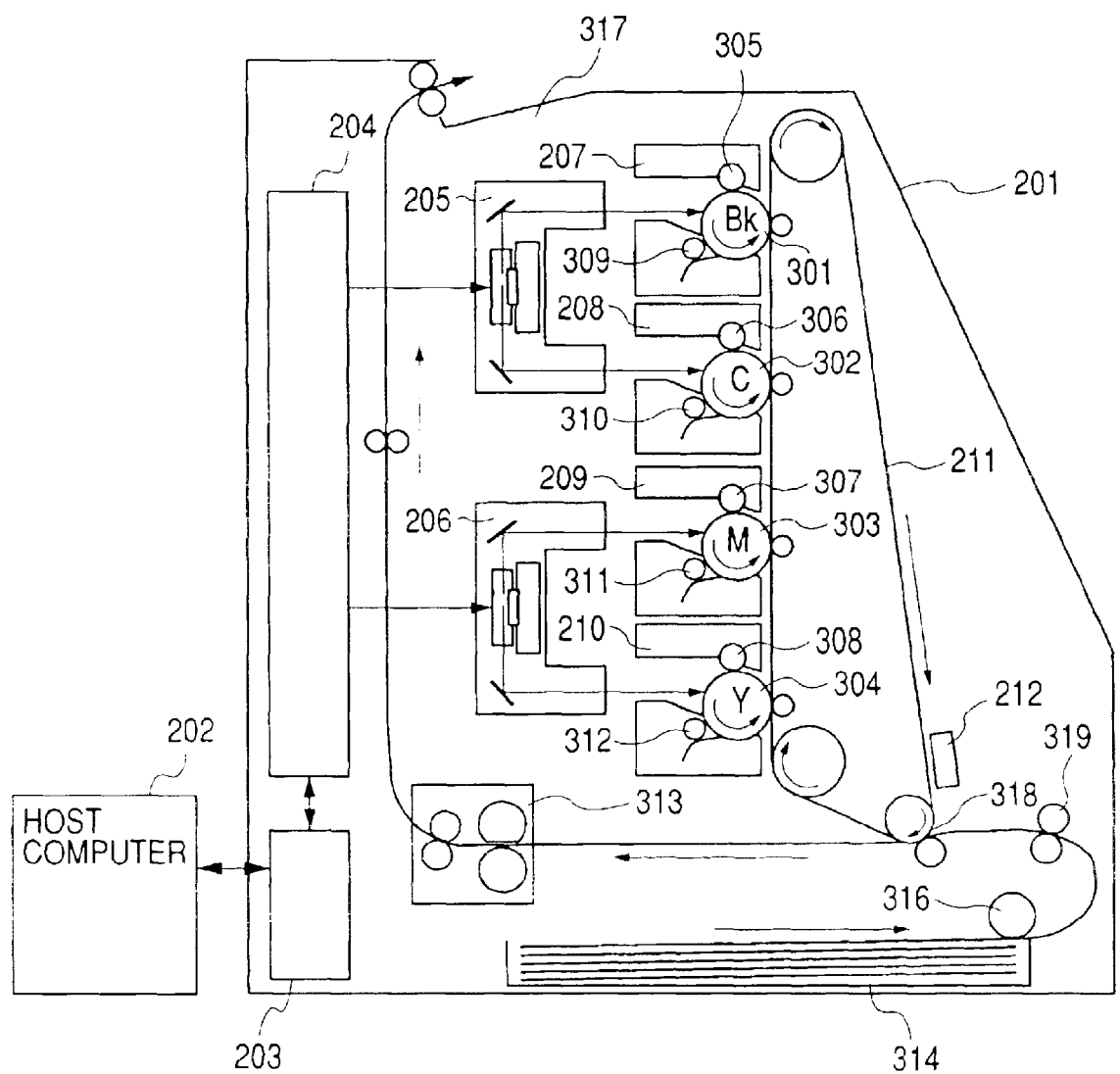
FIG. 3 is a cross-sectional view showing the structure of the first embodiment.

FIG. 3 is a cross-sectional view showing the construction of a color laser printer (hereinafter referred to as the laser printer) which is an image forming apparatus according to the present embodiment. The reference numeral 201 designates the laser printer, and the reference numeral 202 denotes a host computer. The present embodiment is an example of a four-drum type color laser printer. This color laser printer is provided with image forming portions for four colors to form a color image comprising images of four colors (yellow: Y, magenta: M, cyan: C, and black:BK) superimposed one upon another.

The image forming portions comprise toner cartridges 207 to 210 having photosensitive drums 301–304 as image bearing members, and scanner units 205 and 206 having laser diodes (corresponding to laser beam generating elements in the appended claims) for generating laser beams as image exposing light sources. A toner cartridge is provided for each of the four colors.

Also, the present embodiment is characterized in that with regard to the scanner units 205 and 206, a common one is provided for yellow and magenta, and a common one is provided for cyan and black. These scanner units 205 and 206 will be described later in detail.

Upon receipt of image data from the host computer 202, a video controller 203 in the laser printer 201 evolves the image data into bit map data and produces a video signal for image forming. The video controller 203 and an engine controller 204 effect serial communication, and effect the transmission and reception of information. The video signal is transmitted to the engine controller 204, which in turn drives laser diodes (not shown) in the scanner units 205 and 206 in conformity with the video signal, whereby images are formed on the photosensitive drums 301 to 304 in the toner cartridges 207 to 210. As regards the photosensitive drums 301 to 304, the photosensitive drum 301 is utilized for forming a black image, the photosensitive drum 302 is utilized for forming a cyan image, the photosensitive drum 303 is utilized for forming a magenta image and the photosensitive drum 304 is utilized for forming a yellow image.

The photosensitive drums are in contact with an intermediate transfer belt 211, and the images formed on the photosensitive drums for the respective colors are transferred and successively superimposed onto the intermediate transfer belt 211, whereby a color image is formed.

As regards the respective color images, the yellow (Y) image is first transferred to the intermediate transfer belt 211, and magenta (M), cyan (C) and black (BK) are transferred thereonto in the named order, whereby a color image if formed.

On the other hand, the photosensitive drum 301 is rotated at a constant speed by a drum motor, not shown. The photosensitive drum 301 has its surface uniformly electrified by an electrifying roller 305, and a laser beam modulated by the video signal produced by the video controller scans this surface, whereby an invisible electrostatic latent image is formed. The electrostatic latent image is visualized as a toner image by a developing device 309.

Also, a recording sheet in a cassette 314 is fed to registration rollers 319 by a sheet feeding roller 316, and the recording sheet is conveyed in synchronism with the image on the intermediate transfer belt 211 by the drive timing of the registration rollers 319. The color image is then transferred from the intermediate transfer belt (ITB) 211 to the recording sheet by a transferring roller 318 (secondary transfer). The recording sheet to which the image has been transferred has the image thereon fixed by heat and pressure in a fixing device 313, where after it is discharged onto a sheet discharge tray 317 on the upper portion of the printer.

Also, there is a registration detecting sensor 12 for monitoring the registration position of the image on the intermediate transfer belt 211. This sensor is for reading the position of the image of each color formed on the intermediate transfer belt 211, and feeding back the data thereof to the video controller 203 or the engine controller 204 to thereby adjust the registration position of the image of each color and prevent color misregister.

Figure 1:
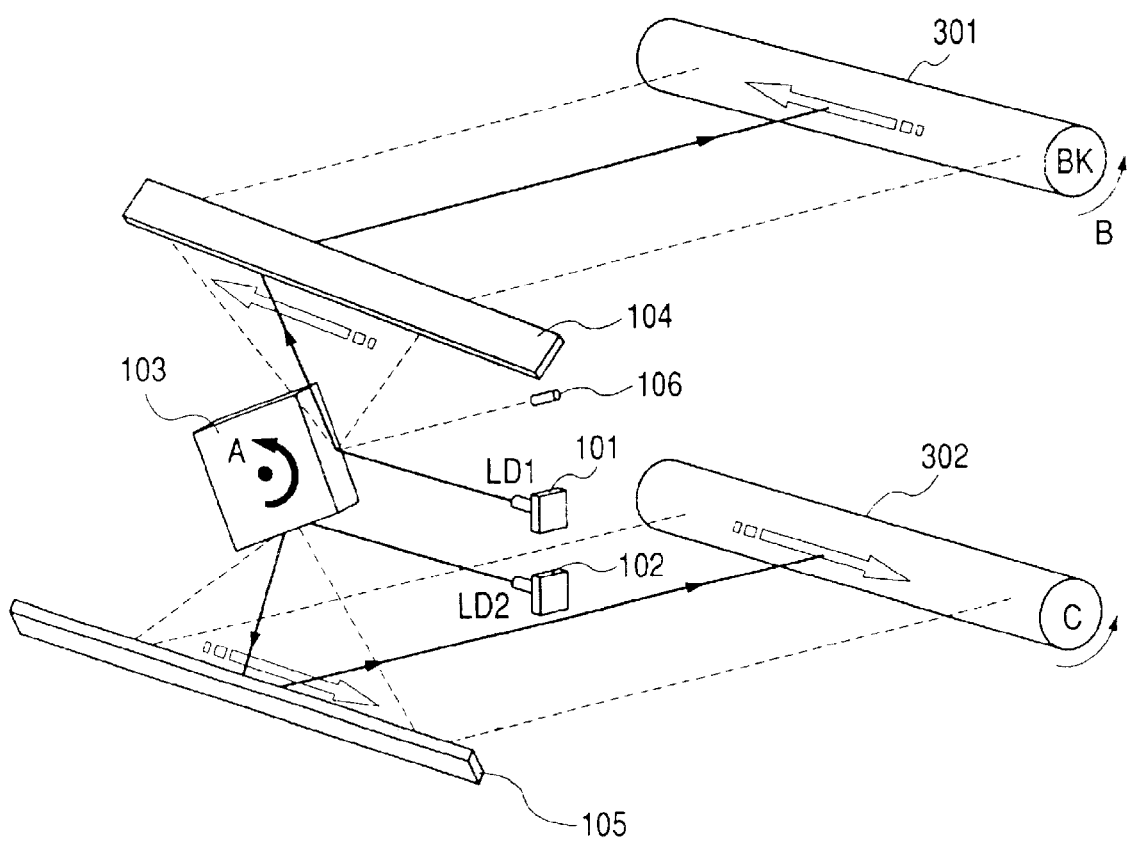
FIG. 1 is a perspective view of a scanner unit used in a first embodiment of the present invention.

FIG. 1 shows the details of the scanner units 205 and 206 in FIG. 3.

The scanner units 205 and 206 are of the same construction and therefore, the construction of one scanner unit 205 will now be described.

In FIG. 1, the reference numerals 101 and 102 designate laser diodes which scan on the photosensitive drums 301 and 302 by the video signal produced by the engine controller 204. For the sake of convenience, the laser diode 101 is referred to as a first laser diode (LD1), and the laser diode 102 is referred to as a second laser diode (LD2). The reference numeral 103 denotes a polygon mirror (corresponding to deflecting and scanning means appearing in claim 1) which is rotated at a constant speed in the direction of arrow A in FIG. 1 by a motor, not shown, and scans while reflecting beams from the laser diodes LD1 and LD2. The aforementioned motor is controlled and rotated so as to assume a constant speed by the acceleration signal and deceleration signal of a speed control signal from the engine controller 204.

The reference numeral 106 designates an optical sensor on the scanning path of the laser diode LD1 which generates a signal for producing a horizontal synchronizing signal upon incidence of the laser beam thereon, and this optical sensor is called a BD (beam detect) sensor. The BD sensor is present only on the scanning path of the laser diode LD1 and is not present on the scanning path of the other laser diode LD2.

The laser beam emitted from the laser diode LD1 is scanned while being reflected by the polygon mirror 103, is further reflected by a turn-back mirror 104 and leftwardly scans on the photosensitive drum 301.

Actually, the laser beam travels through various lens units, not shown, in order to be focused on the photosensitive drum, or to convert the laser beam from a divergent light into a parallel light.

Usually, the video controller transmits the video signal to the engine controller a predetermined time after it has detected the output signal of the BD sensor 106. Thereby, the writing-out positions for the main scanning of the images on the photosensitive drums by the laser beam always coincide with one another.

On the other hand, the laser diode LD2, like the laser diode LD1, forms an electrostatic latent image on the photosensitive drum 302.

With regard to the detection of BD, the BD sensor is not present on the scanning path of the laser diode 102 and therefore, a BD signal for the laser diode LD2 is produced by the engine controller 204. In the following description, a horizontal synchronizing signal on the laser side not having this BD sensor will be called a pseudo /BD signal. The details of a producing method will be describe later.

In this manner, a black (BK) color image by the laser diode LD1 on the side having the BD sensor 106 is formed on the photosensitive drum 301, and a cyan (C) color image by the laser diode LD2 on the side not having the BD sensor 106 is formed on the photosensitive drum 302. The black (BK) side has a BD sensor, and the cyan (C) side does not have a BD sensor. Conversely, the black (BK) side may not have a BD sensor, and the cyan (C) side may have a BD sensor.

With regard to the scanner unit 206 similar in construction to the scanner unit 205, a magenta (M) color image is formed on the photosensitive drum 303 and a yellow (Y) color image is formed on the photosensitive drum 304. The yellow (Y) side does not have a BD sensor, and the magenta (M) side has a BD sensor. Conversely, the magenta (M) side may not have a BD sensor, and the yellow (Y) side may have a BD sensor.

What has been described above is a series of image forming processes.

Figure 2:
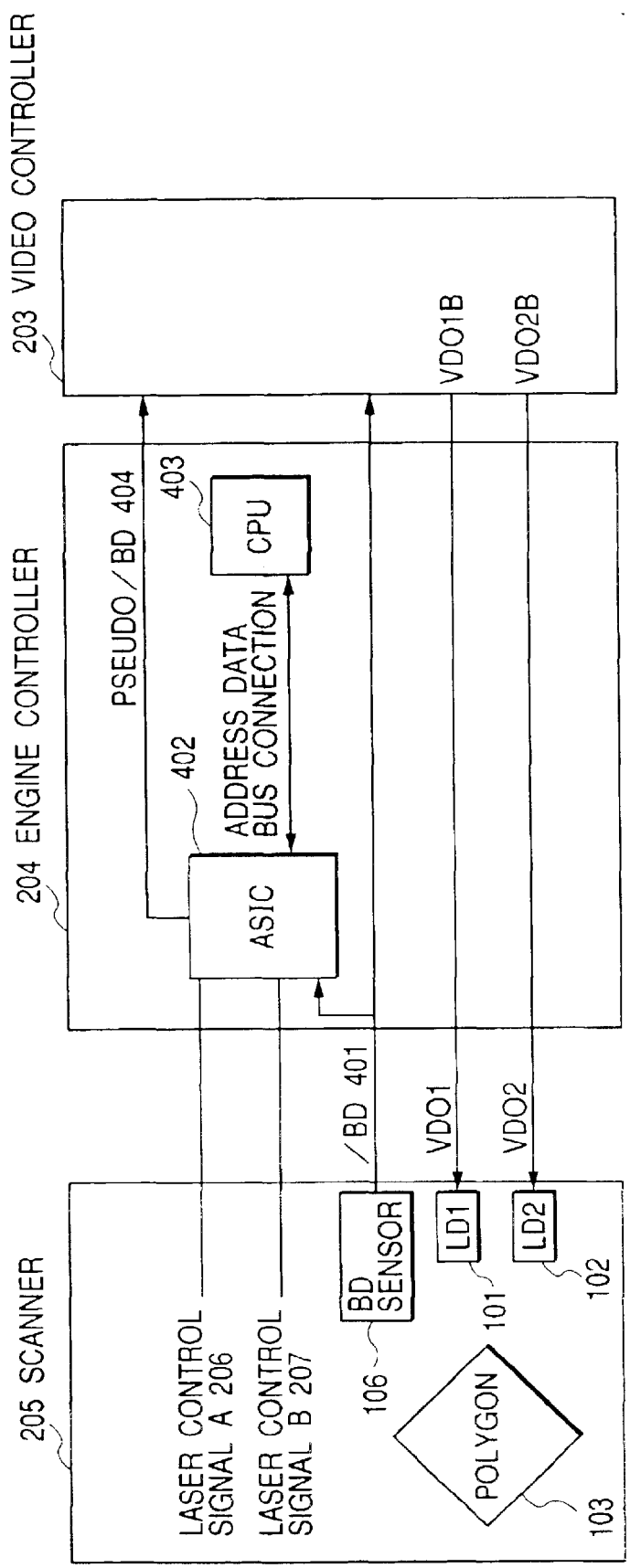
FIG. 2 is a block diagram showing the construction of the first embodiment.

A pseudo BD producing method will now be described with reference to the block diagram of FIG. 2.

An ASIC 402 and a CPU 403 are provided in the engine controller 204, and the ASIC 402 and the CPU 403 are address-data-bus-connected together. This ASIC 402 is provided with a circuit for producing a pseudo /BD signal, and produces a laser control signal A (206) and a laser control signal B (207) for controlling the light emission of the laser to detect the main scanning writing-out position timing. First, a /BD signal 401 which is a horizontal synchronizing signal from the BD sensor is connected to the ASIC 402 provided in the engine controller 204 and the video controller 203. The ASIC 402 receives the /BD signal 401, and calculates a BD period, and the CPU 403 calculates the correction value of the pseudo /BD signal, and inputs the correction value to the ASIC 402 through an address data bus. The ASIC 402 produces pseudo /BD 404. The video controller 203 receives /BD 401 which is an output from the BD sensor 106 and the pseudo /BD signal 404 produced by the ASIC 402. Also, at certain timing from after the BD sensor 106 has detected, image data VD01 and VD02 are outputted from the video controller 203 to the LD1 (101) and LD2(102) of the scanner 205. An image is formed on the intermediate transfer belt 211 by the image data VD01 and VD02, and is printed on a recording sheet.

Also, in order to prevent color misregister, the position of an image of a color on a side with the BD sensor and a color on a side without the BD sensor formed on the intermediate transfer belt 211 is read by a registration detecting sensor 212 to thereby adjust the registration position of the image.

Figure 5:
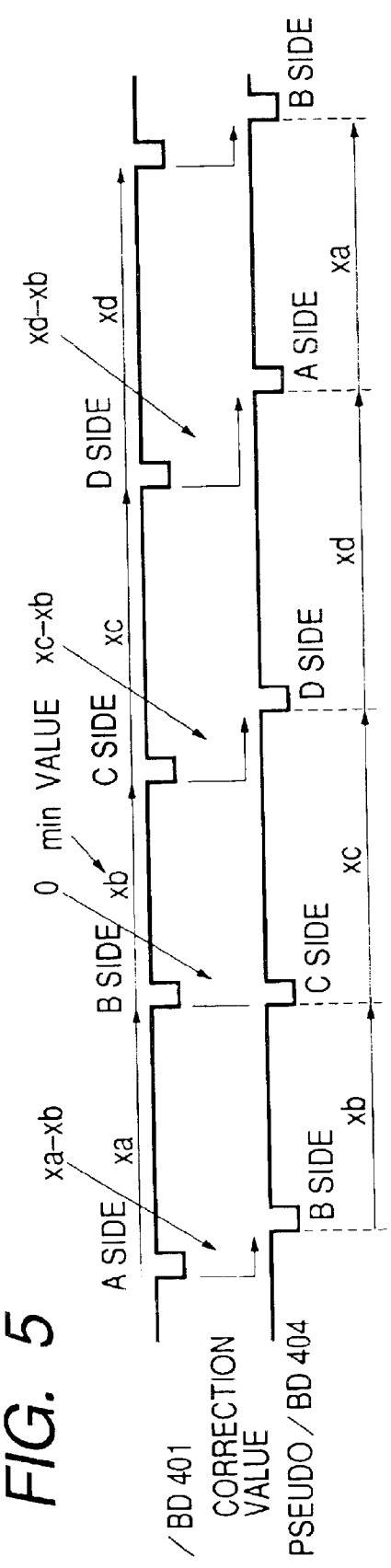
FIG. 5 is a timing chart for illustrating the operation of the first embodiment.
Figure 10:
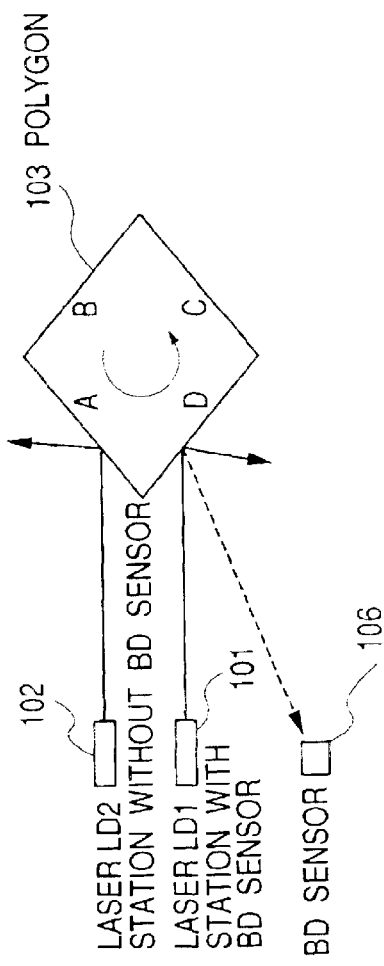
FIG. 10 shows the relation among a polygon, a laser and a BD sensor in the first embodiment.

A method of calculating the correction value and a pseudo BD producing method for each four sides will now be described with reference to the timing chart of FIG. 5 and FIG. 10 showing the relation among the polygon, the laser and the BD sensor.

The period of the A side of the /BD signal 401 of each side of the polygon 103 measured by the ASIC 402 is xa, the period of the B side is xb, the period of the B side is xb, the period of the C side is xc, and the period of the side is xd. From the BD period of each side, the smallest one of these four periods is subtracted, and the resultant value is defined as the correction value. This is because when the /BD signal side uses the A side, the pseudo /BD signal side uses the B side, and when the /BD signal side uses the B side, the pseudo /BD signal side uses the C side, and when the /BD signal side uses the C side, the pseudo /BD signal side uses the D side, and when the /BD signal side uses the D side, the pseudo /BD signal side uses the A side, and the correction value is determined from such correspondence between the /BD signal side and the pseudo /BD signal side. Also, the correction value depends on the polygon and is almost free of a variation with time and therefore, the writing-out form the /BD signal is constant. Also, that side of the polygon which is the smallest value of the BD period is determined as a correction value 0, whereby a reference side is determined.

Consequently, when the shortest BD period is defined as xb, the correction value of the B side of the pseudo /BD signal corresponding to the A side of the /BD signal side is (the period of the $A$ side of the $BD$ signal)−(the shortest $BD$ period)=$xa-xb$, the correction value is xa−xb;

the correction value of the C side of the pseudo /BD signal corresponding to the B side of the /BD signal side is (the period of the $B$ side of the $BD$ signal)−(the shortest $BD$ period)=$xb-xb$, the correction value is 0;

the correction value of the D side of the pseudo /BD signal corresponding to the C side of the /BD signal side is (the period of the $C$ side of the $BD$ signal)−(the shortest $BD$ period)=$xc-xb$, the correction value is xc−xb;

the correction value of the A side of the pseudo /BD signal corresponding to the D side of the /BD signal side is (the period of the $D$ side of the $BD$ signal)−(the shortest $BD$ period)=$xd-xa$, the correction value is xd−xa.

The correction value of the pseudo /BD signal of the /BD signal of the A side (the pseudo /BD signal of the B side) is xa−xb and therefore, a pseudo /BD signal delayed by (xa−xb) clocks from the /BD signal is produced and outputted.

The correction value of the pseudo /BD signal of the /BD signal of the B side (the pseudo /BD signal of the C side) is 0 and therefore, the /BD signal itself is outputted as pseudo BD.

The correction value of the pseudo /BD signal of the /BD signal of the C side (the pseudo /BD signal of the D side) is xc−xb and therefore, a pseudo /BD signal delayed by (xc−xb) clocks from the /BD signal is produced and outputted.

The correction value of the pseudo /BD signal of the /BD signal of the D side (the pseudo /BD signal of the A side) is xd−xa and therefore, a pseudo /BD signal delayed by (xd−xa) clocks from the /BD signal is produced and outputted.

In the case of the /BD signal 401, there is produced such a pseudo /BD signal 404 as shown in FIG. 5.

Figure 7:
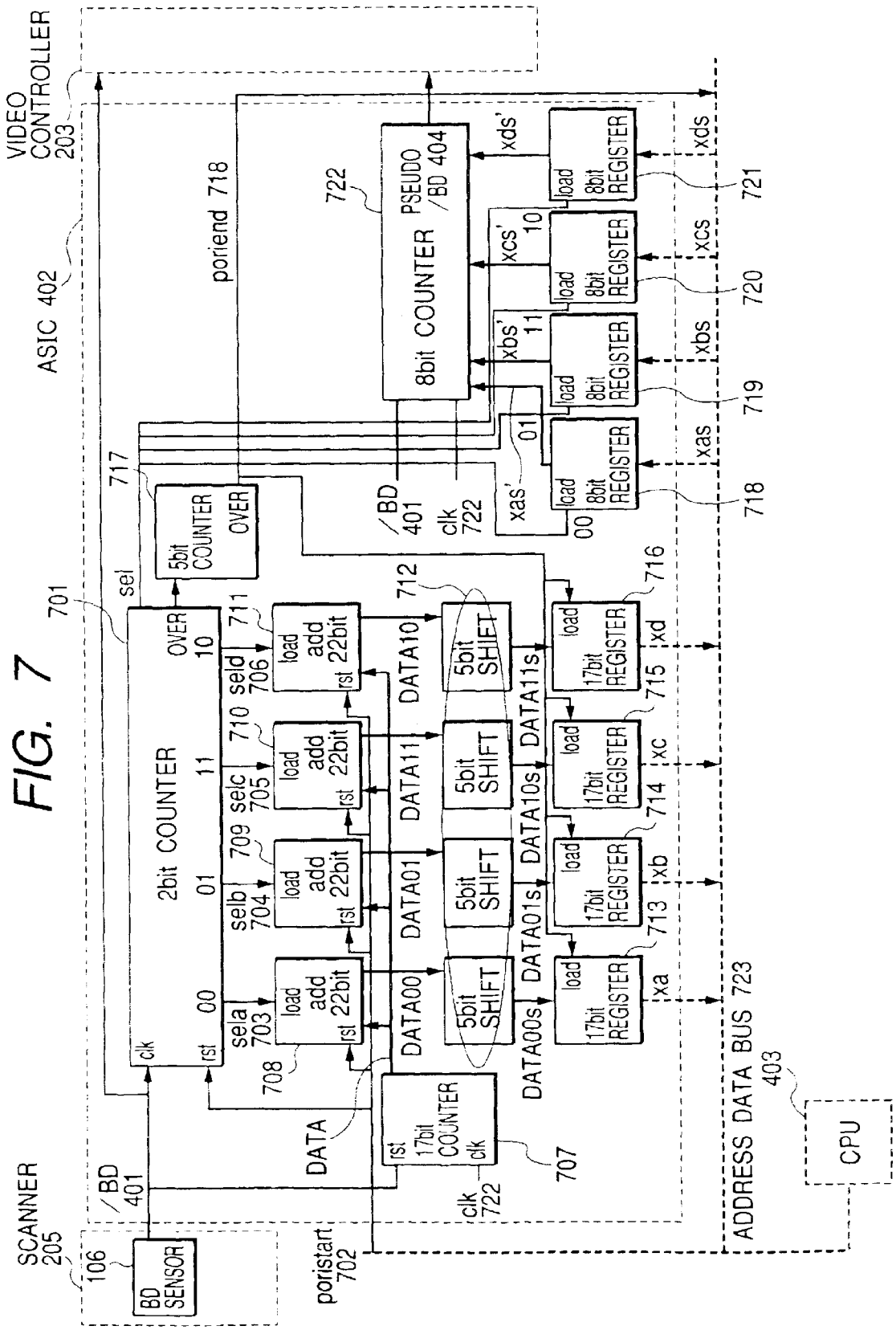
FIG. 7 is a circuit block diagram of an ASIC in the first embodiment and a second embodiment.

The circuit construction will now be described with reference to FIG. 7 which is a block diagram of the internal circuit of the ASIC 402.

Figure 4:
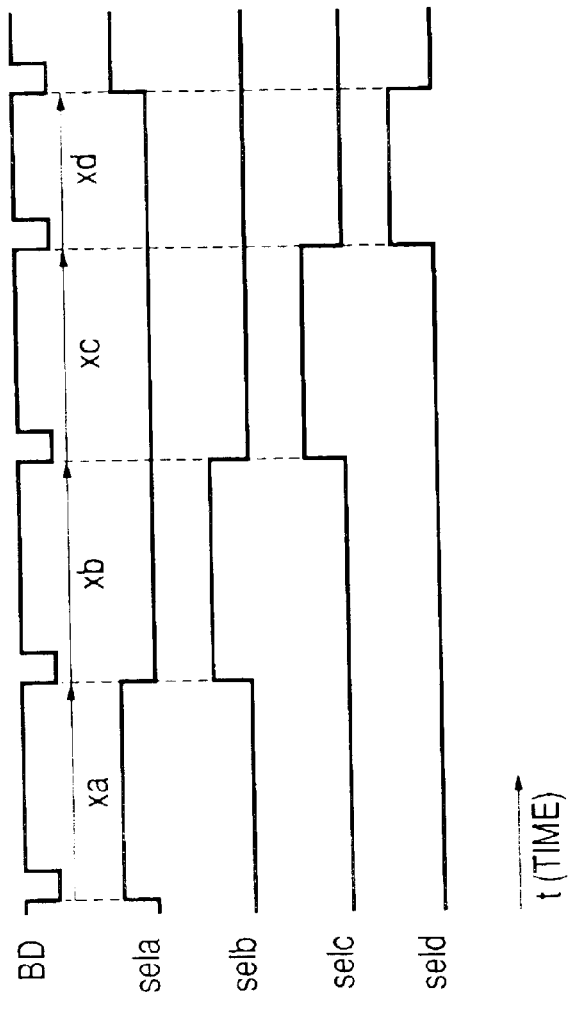
FIG. 4 is a timing chart determining the polygon surface position of an ASIC internal circuit.

First, a /BD signal 401 outputted from the BD sensor 106 of the scanner unit 205 and a signal poristart 702 for starting pseudo BD control by the use of the signal line of the address data bus ADDRESSDATABUS 723 of the CPU 403 and the ASIC 402 are inputted to a 2-bit counter 701 to thereby make the 2-bit counter 701 perform the repeated operation of 00→01→11→10→00 so that which side of the polygon 103 the laser is irradiating can be known. Assuming that the time when the counter value (DATA) of each of them is 00 is the A side, the time when it is 01 is defined as the B side, the time when it is 11 is defined as the C side, and the time when it is 10 is defined as the D side. Thereupon, as shown in the timing chart shown in FIG. 4 which determines the polygon side position of the circuit in the ASIC, when the BD period of the A side is being measured, sela 703 assumes a high level, and when the BD period of the B side is being measured, selb 704 assumes a high level, and when the BD period of the C side is being measured, selc 705 assumes a high level, and when the BD period of the D side is being measured, seld 706 assumes a high level. Next, the BD period is counted at clk 722 by a 17-bit counter 707, and when sela 703, selb 704, selc 705 and seld 706 are selected, the count values DATA of the BD periods of the respective sides of the polygon 103 are added to 708, 709, 710 and 711 32 times each. In order to divide the BD periods added 32 times each by 32 to thereby calculate the average value of a period, the added count values DATA00, DATA01, DATA11 and DATA10 are shifted (712) to a 5-bit less significant rank, and more significant 5 bits are deleted. The count value is stored in 17-bit registers 713, 714, 715 and 715. When it is detected by the use of a 5-bit counter 717 that the BD periods of the polygon 103 have been added 32 times each, the poriend 718 of a BD period addition terminating signal is outputted. These 17-bit registers 713, 714, 715 and 716 assume the average value of the BD periods, and when the poriend 718 is outputted, ADDRESSDATABUS 723 is used in the CPU 403, which thus can read the average values xa, xb, xc and xd of the BD periods corresponding to 32 times. Also, the CPU 403 can read the poriend 718 by the use of ADDRESSDATABUS 723 and therefore, when it is detected that this poriend 718 is outputted, the CPU 403 can read the average values xa, xb, xc and xd of the BD periods.

Next, the CPU 403 inputs correction values xas, xbs, xcs and xds corresponding to the respective polygon sides form ADDRESSDATABUS 723 to the 8-bit registers 718, 719, 720 and 721 of the ASIC 402. One of the correction values is selected by sela 703, selb 704, selc 705 and seld 706, and from the correction values xas', xbs', xcs' and xds' thereof, pseudo /BD 404 is outputted to the video controller 203 by an 8-bit counter 722 While in the present embodiment, the correction value has been calculated from the average of the BD periods of the respective sides of the polygon 103 corresponding to 32 times, this number of times is not restrictive. For example, when the BD periods of the respective sides are added 64 times each, the count values can be shifted to a 6-bit less significant rank and more significant 5 bits can be deleted.

What has been described above is the description of the block diagram of the circuit in the ASIC.

Figure 6:
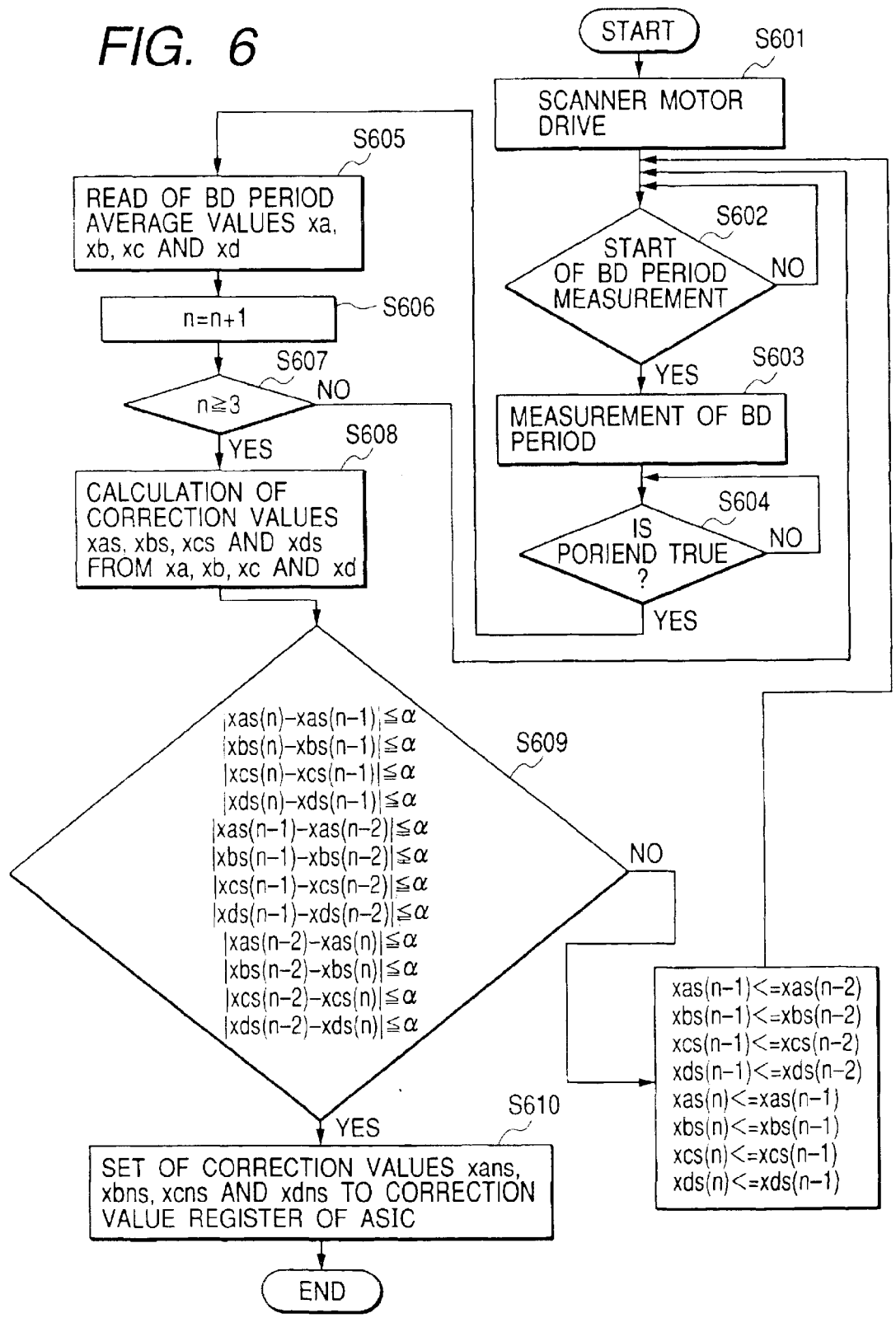
FIG. 6 is an operation flow chart of a CPU in the first embodiment.

These series of operations of the CPU 403 will now be described with reference to the flow chart of FIG. 6.

Instructions to rotatively drive the scanner motor are given to the ASIC 402 (S601).

Next, the CPU 403 instructs the ASIC 402 to start the measurement of the BD period (S602). Thereupon, the ASIC 402 measures the BD period of each side of the polygon (S603), and the average values of the BD periods of the respective sides of the polygon are calculated. When the aforementioned respective BD periods are measured, the ASIC 402 outputs the BD period measurement terminating bit poriend to the CPU 403.

When the BD period measurement terminating bit poriend becomes true (S604), the CPU 403 reads the average values xa, xb, xc and xd of the BD periods of the respective sides of the polygon measured by the ASIC 402 (S605). This is the n-th reading.

Next, if the number of times of the reading is three times or greater, the calculation of the correction values of S608 is effected, and if the number of times of the reading is two times or less, return is made to S602 to measure the BD periods again.

If the number of times of the reading is three times or greater, the CPU 403 calculates the correction values from the BD periods of the respective sides of the polygon (S608).

Next, the CPU 403 compares the aforementioned correction values xas(n), xbs(n), xcs(n) and xds(n) calculated from the BD periods measured at the (n)th time, correction values xas(n−1), xbs(n−1), xcs(n−1) and xds(n−1) calculated from the BD periods of the respective sides of the polygon measured at the (n−1)th time, and correction values xas(n−2), xbs(n−2), xcs(n−2) and xds(n−2) calculated from the BD periods of the respective sides of the polygon measured at the (n−2)th time further preceding the (n−1)th time, as shown below (S609), and if all are α or less, the CPU sets the correction values xas(n), xbs(n), xcs(n) and xds(n) in a correction register (S610). If even one of all is not α or less, return is made to S602, where the CPU gives the instructions to start the measurement of the BD period. α is any value.

$|xas(n)-xas(n-1)| \leq \alpha$ $|xbs(n)-xbs(n-1)| \leq \alpha$ $|xcs(n)-xcs(-1)| \leq \alpha$ $|xds(n)-xcs(-1)| \leq \alpha$ $|xas(n-1)-xas(n-2)| \leq \alpha$ $|xbs(n-1)-xbs(n-2)| \leq \alpha$ $|xcs(n-1)-xcs(n-2)| \leq \alpha$ $|xds(n-1)-xds(n-2)| \leq \alpha$ $|xas(n-2)-xas(n)| \leq \alpha$ $|xbs(n-2)-xbs(n)| \leq \alpha$ $|xcs(n-2)-xcs(n)| \leq \alpha$ $|xds(n-2)-xds(n)| \leq \alpha$ Thereupon, the pseudo /BD signal 404 is outputted from the ASIC 402.

What has been described above is the series of operations of the CPU.

As described above, in a scanning optical system having a polygon and two stations, the side division error of the polygon can be eliminated by measuring the BD period of each side of the polygon, and producing from the BD period the BD signal (pseudo BD signal) of the side without the BD sensor.

Second Embodiment

A "pseudo /BD producing method" which is a second embodiment will hereinafter be described.

Figure 8:
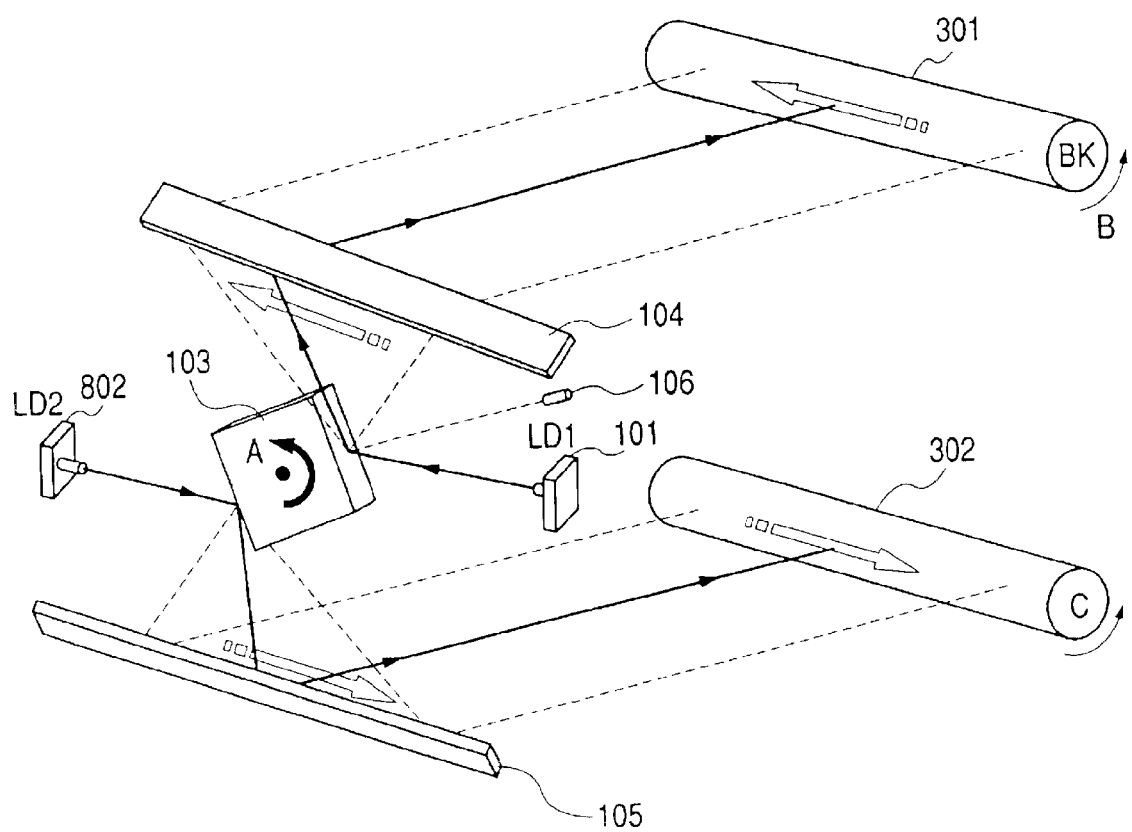
FIG. 8 is a perspective view of the scanner unit used in the first embodiment.
Figure 9:
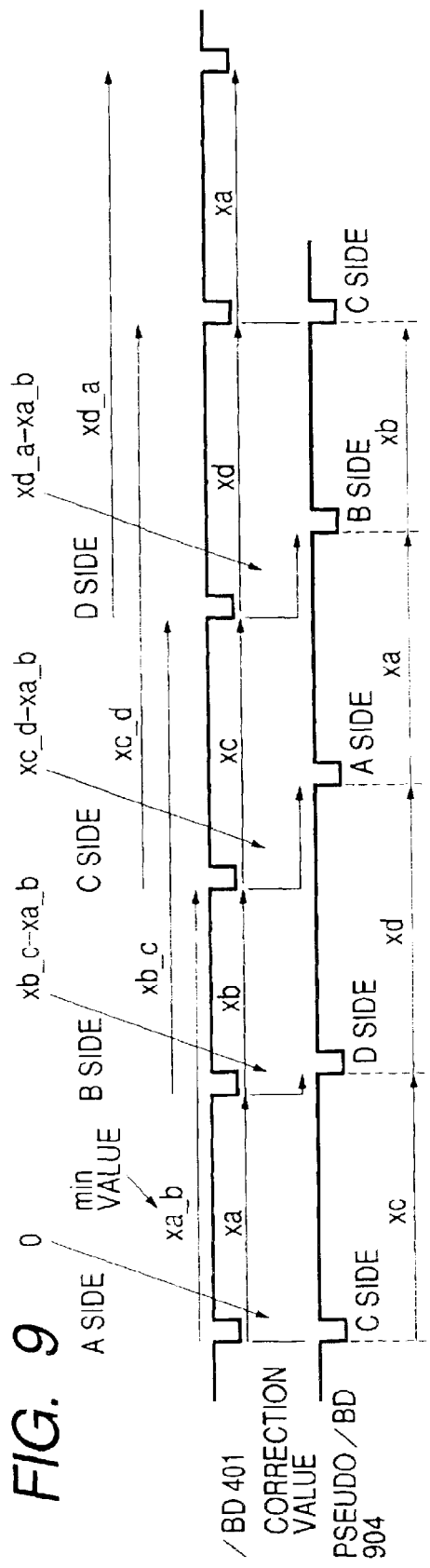
FIG. 9 is a timing chart for illustrating the operation of the first embodiment.
Figure 11:
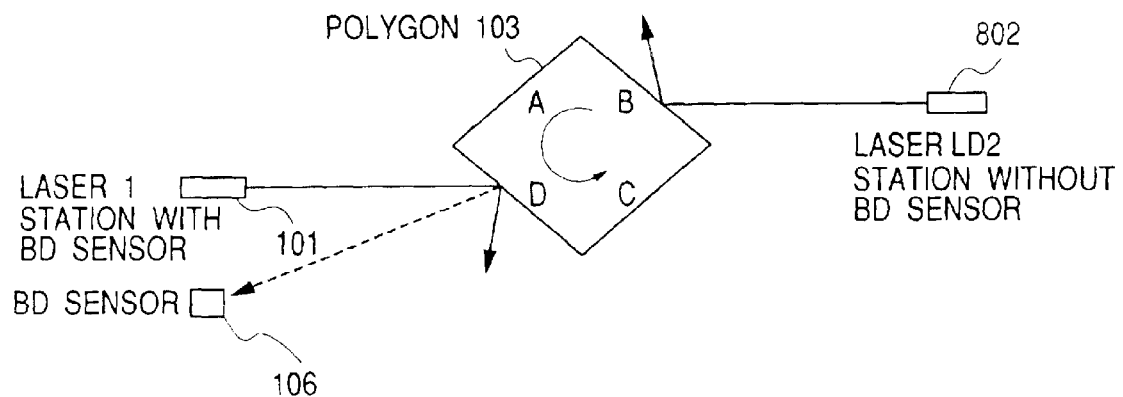
FIG. 11 shows the relation among a polygon, a laser and a BD sensor in the second embodiment.
Figure 12:
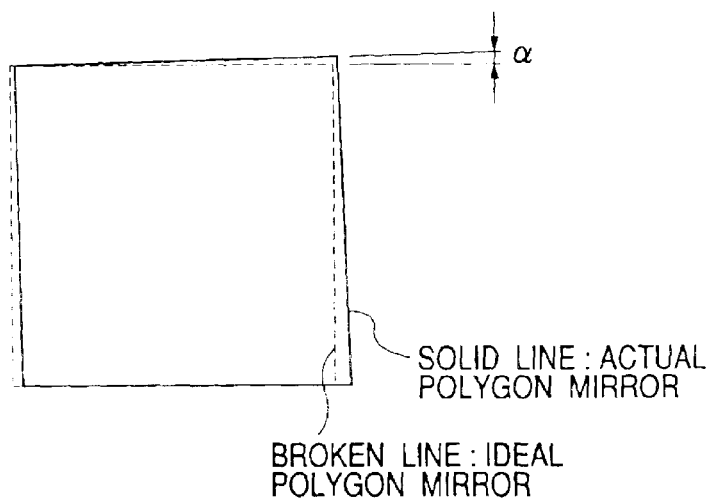
FIG. 12 is a view of a polygon mirror for illustrating an example of the prior art.
Figure 13:
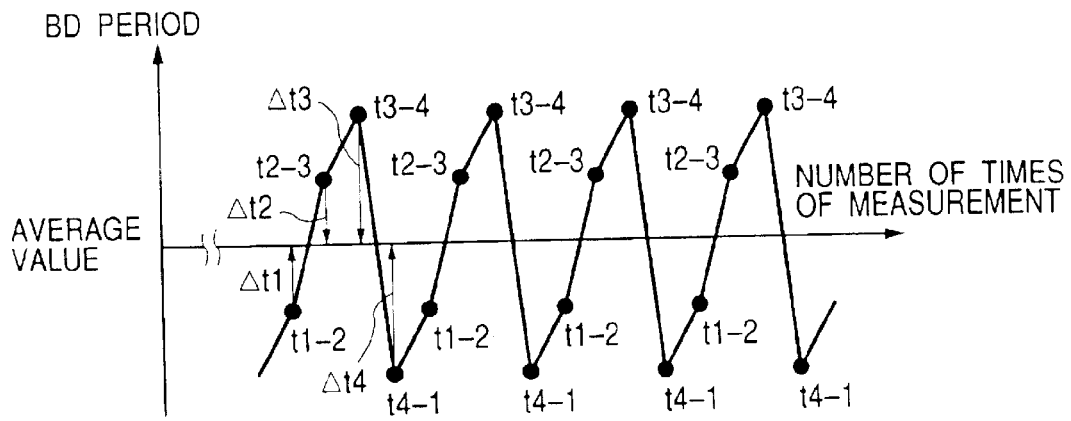
FIG. 13 is a plot graph of a BD period illustrating the example of the prior art.
Figure 14:
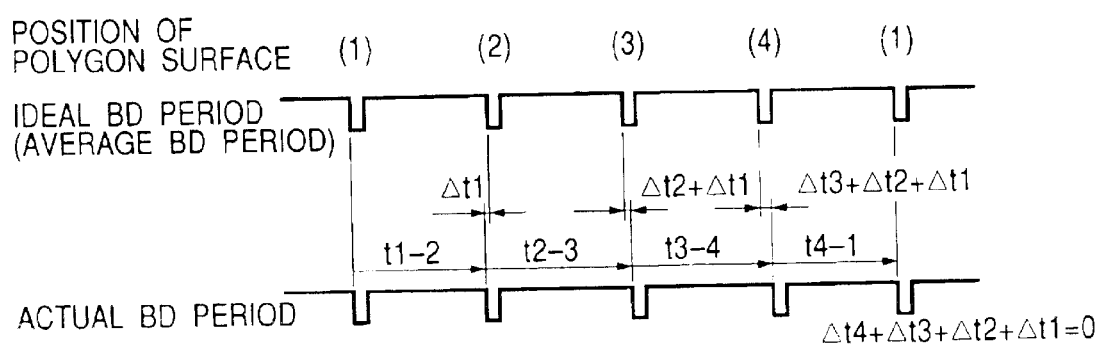
FIG. 14 is a timing chart of the BD period illustrating the example of the prior art.
Figure 15:
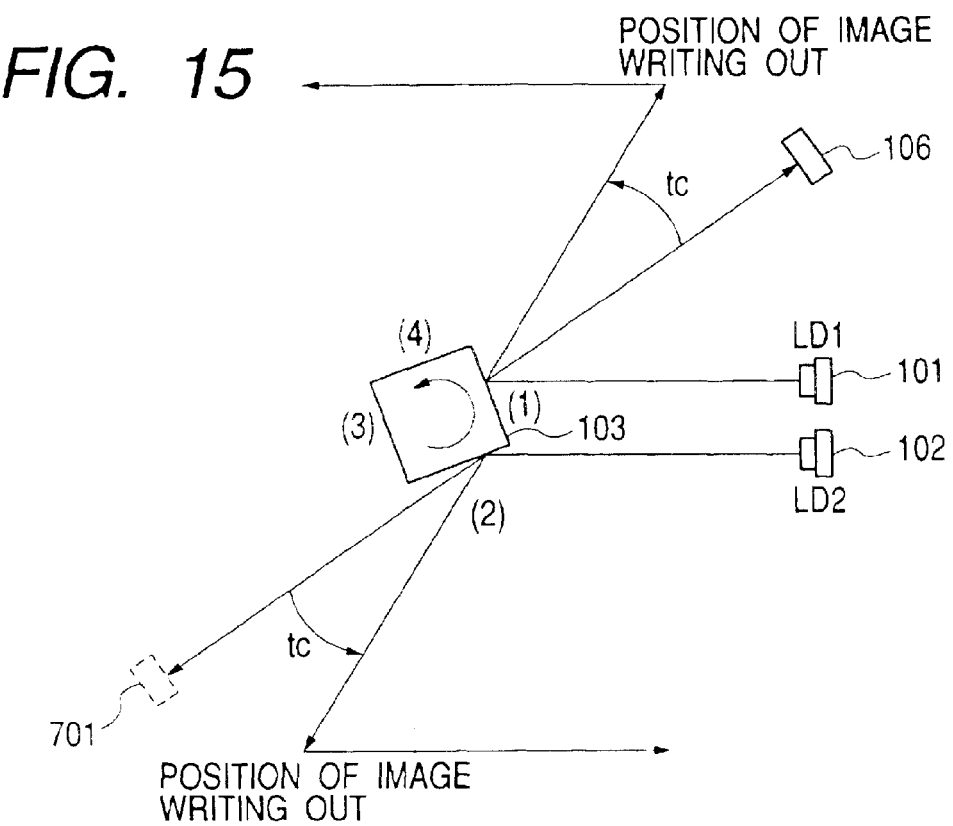
FIG. 15 is a view of a scanner unit illustrating the example of the prior art.
Figure 16:
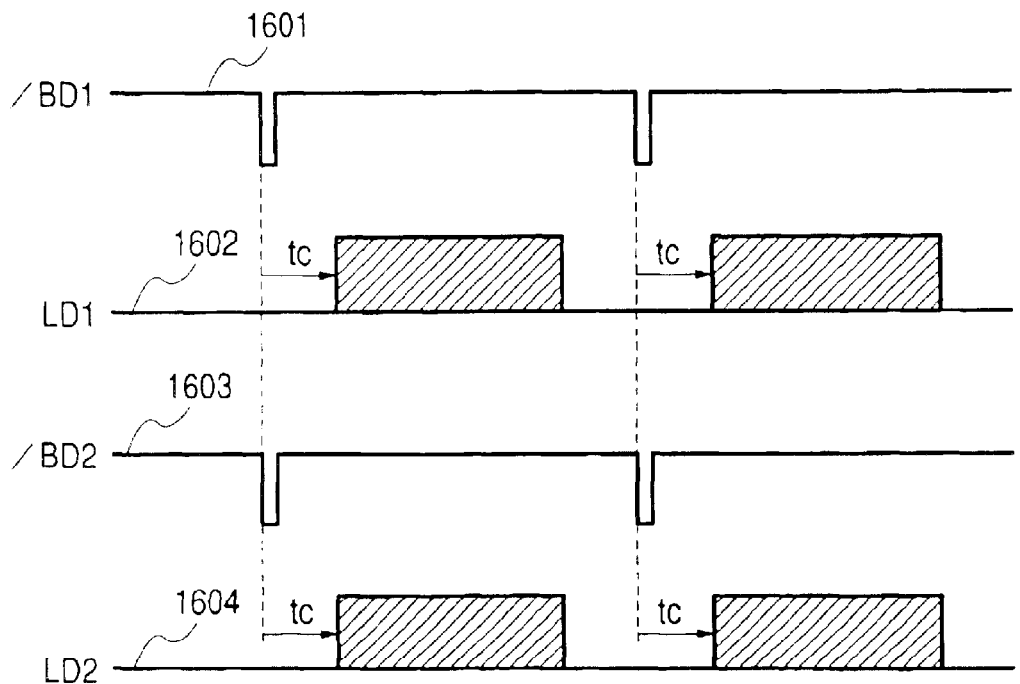
FIG. 16 is a timing chart illustrating the example of the prior art.

FIG. 8 shows a scanner unit in the second embodiment. The difference of the second embodiment from the first embodiment is that LD2 (702) is on the side opposite to LD1 (101) with respect to the polygon 103. A laser beam from the laser diode LD1 and a lasa beam from the laser diode LD2 are applied to the polygon mirror 103 at a time from the right side and from the left side in FIG. 8, respectively. In the other points, the construction of the second embodiment is similar to the construction of the first embodiment. In this construction, a method of calculating correction values of each four sides and a pseudo BD producing method will be described with reference to the timing chart of FIG. 9 and FIG. 11 showing the relation among the polygon mirror, the laser and the BD sensor. Here again is shown an embodiment of the four-side polygon. The number of the sides of the polygon is unnecessary.

The combined period of the A side and the B side of the /BD signal 401 of each side of the polygon 103 measured by the ASIC 402 is xa_b, the combined period of the B side and the C side is xb_c, the combined period of the C side and the D side is xc_d, and the combined period of the D side and the A side is xd_a. The smallest one of these four periods is subtracted from the BD period of each side, and the resultant value is defined as a correction value.

Assuming that the shortest BD period is xa_b, the correction value of the C side of the pseudo /BD signal corresponding to the A side of the /BD signal side is (the combined period of the A side and the B side of the/BD signal)−(the shortest BD period) =xa_b−xa_b, the correction value is 0;

the correction value of the D side of the pseudo /BD signal corresponding to the B side of the BD signal side is (the combined period of the B side and the C side of the BD signal)−(the shortest BD period)=xb_c−xa_b, the correction value is xb_c−xa_b;

the correction value of the A side of the pseudo /BD signal corresponding to the C side of the /BD signal side is (the combined period of the C side and the D side of the/BD signal)−(the shortest BD period) =xc_d−xa_b, the correction value is xc_d−xa_b;

the correction value of the B side of the pseudo /BD signal corresponding to the D side of the /BD signal side is (the combined period of the D side and the A side of the/BD signal)−(the shortest BD period) =xd_a−xa_b, the correction value is xd_a−xa_b.

The correction value of the pseudo /BD signal of the /BD signal of the A side (the pseudo /BD signal of the C side) is 0 and therefore, the /BD signal itself is outputted as pseudo /BD.

The correction value of the pseudo /BD signal of the /BD signal of the B side (the pseudo /BD signal of the D side) is xb_c−xa_b and therefore, a pseudo /BD signal delayed by (xb_c−xa_b) clocks from the /BD signal is produced and outputted.

The correction value of the pseudo /BD signal of the BD signal of the C side (the pseudo /BD signal of the A side) is xc_d−xa_b and therefore, a pseudo /BD signal delayed by (xc_d−xa_b) clocks from the /BD signal is produced and outputted.

The correction value of the pseudo /BD signal of the /BD signal of the D side (the pseudo /BD signal of the B side) is xd_a−xa_b and therefore, a pseudo /BD signal delayed by (xd_a−xa_b) clocks from the /BD signal is produced and outputted.

In the case of the /BD signal 401, such a pseudo /BD signal 904 as shown in FIG. 9 is produced.

As described above, in a scanning optical system having a polygon and two stations, in a construction wherein a laser is provided on a side opposite to a laser on a side with a BD sensor with respect to the polygon, the side division error of the polygon can be eliminated by measuring the BD period of each side of the polygon, and producing the BD signal of a side without a BD sensor (pseudo BD signal) from the BD period. Also, the station on the side with the BD sensor and the station on the side without the BD sensor are the same in the location of use of the polygon side for reflecting the laser and therefore, the side accuracy of the polygon is not required and thus, a reduction in the cost of the polygon can be achieved.

Third Embodiment

Description will now be made of a "pseudo BD producing method" which is a third embodiment of the present invention.

Figure 17:
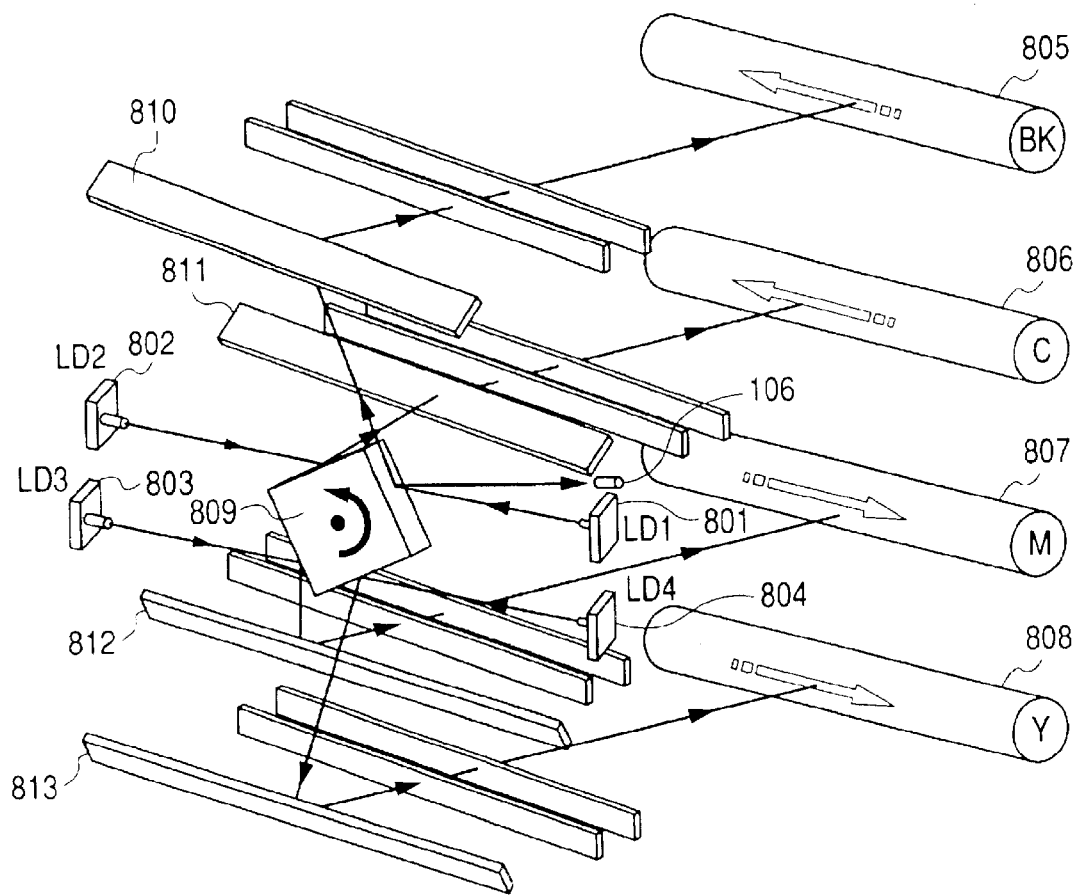
FIG. 17 is a perspective view of a scanner unit used in a third embodiment of the present invention.
Figure 18:
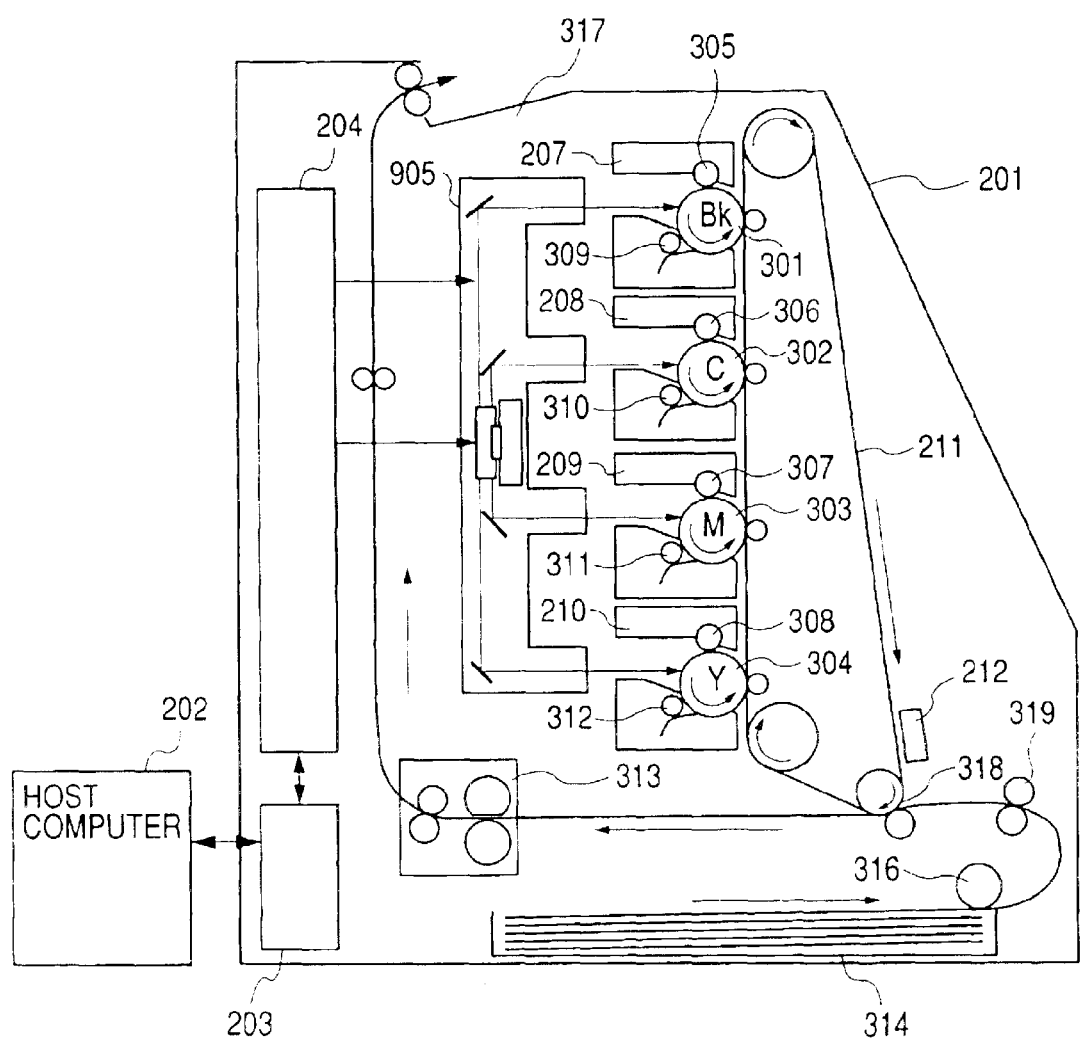
FIG. 18 is a cross-sectional view showing the structure of the third embodiment.

FIG. 18 is a cross-sectional view showing the construction of a color laser printer (hereinafter referred to as the laser printer) which is an image forming apparatus according to the present embodiment. FIG. 17 shows the details of a scanner unit 905 in FIG. 18. The difference of the present embodiment from the first embodiment is that the number of scanner units is one and a polygon 809 is used to effect the formation of an image of four colors.

An image forming portion comprises toner cartridges 207 to 210 having photosensitive drums 301–304 as image bearing members, and a scanner unit 905 having laser diodes (corresponding to laser beam generating elements in the appended claims) generating laser beams as light sources for image exposure. A toner cartridge is provided for each of the four colors.

Also, as regards the scanner unit 905, it is a feature of the present embodiment that a common scanner unit 905 is used for yellow, magenta, cyan and black.

The differences of this scanner unit 905 from the scanner units in the first embodiment will now be described in detail.

In FIG. 17, the reference numerals 801, 802, 803 and 804 designate laser diodes which scan on photosensitive drums 805, 806, 807 and 808 by a video signal produced by an engine controller 204. For the sake of convenience, the laser diode 801 is referred to as a first laser diode (LD1), the laser diode 802 is referred to as a second laser diode (LD2), the laser diode 803 is referred to as a third laser diode (LD3), and the laser diode 804 is referred to as a fourth laser diode (LD4). The reference numeral 809 denotes a polygon mirror (corresponding to a rotary polygon mirror in the appended claims) which is rotated at a constant speed in the direction of arrow A in FIG. 17 by a motor, not shown, and scans while reflecting beams from the laser diodes LD1, LD2, LD3 and LD4. The aforementioned motor is controlled and rotated so as to assume a constant speed by the acceleration signal and deceleration signal of a speed control signal from the engine controller 204.

A BD sensor 106 is present only on the scanning path of the laser diode LD1 and no BD sensors are present on the scanning paths of the other laser diodes LD2, LD3 and LD4.

The laser beam emitted from the laser diode LD1 is scanned while being reflected by the polygon mirror 809, is further reflected by a turn-back mirror 810 and leftwardly scans on the photosensitive drum 805. On the other hand, the laser diode LD2, like the laser diode LD1, forms an electrostatic latent image on the photosensitive drum 806. Also, the laser diode LD3, like the laser diode LD1, forms an electrostatic latent image on the photosensitive drum 807. Also, the laser diode LD4, like the laser diode LD1, forms an electrostatic latent image on the photosensitive drum 808.

Regarding the detection of BD, the engine controller 204 produces a BD signal for the laser diode LD2, a BD signal for the laser diode LD3, and a BD signal for the laser diode LD4. The details of a producing method will be described later.

In this manner, a black (BK) color image by the laser diode LD1 having the BD sensor 106 is formed on the photosensitive drum 805, a cyan (C) color image by the laser diode LD1 not having the BD sensor 106 is formed on the photosensitive drum 806, a magenta (M) color image by the laser diode LD3 is formed on the photosensitive drum 807, and a yellow (Y) color image by the laser diode LD4 is formed on the photosensitive drum 808. The black (BK) side has the BD sensor, and the cyan (C) side, the magenta (M) side and the yellow (Y) side do not have the BD sensors. Alternatively, the black (BK) side may not have the BD sensor, and the cyan (C) side, the magenta (M) side or the yellow (Y) side may have the BD sensor.

What has been described above is a series of image forming processes.

The construction of a pseudo BD producing method is similar to that in the first embodiment and the second embodiment.

Figure 21B:
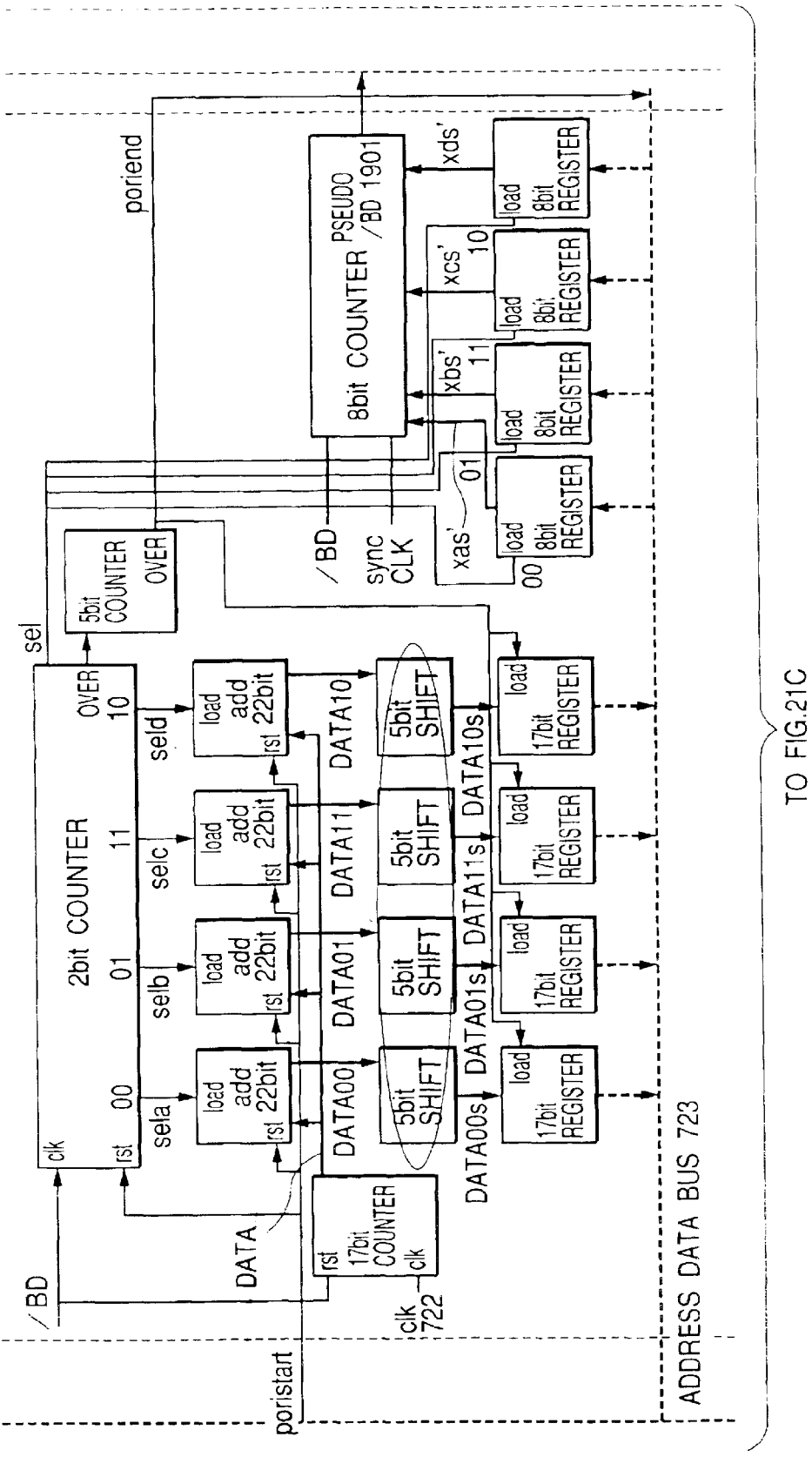
FIG. 21 is comprised of FIGS. 21A, 21B and 21C showing circuit block diagrams of an ASIC in the third embodiment.
Figure 21C:
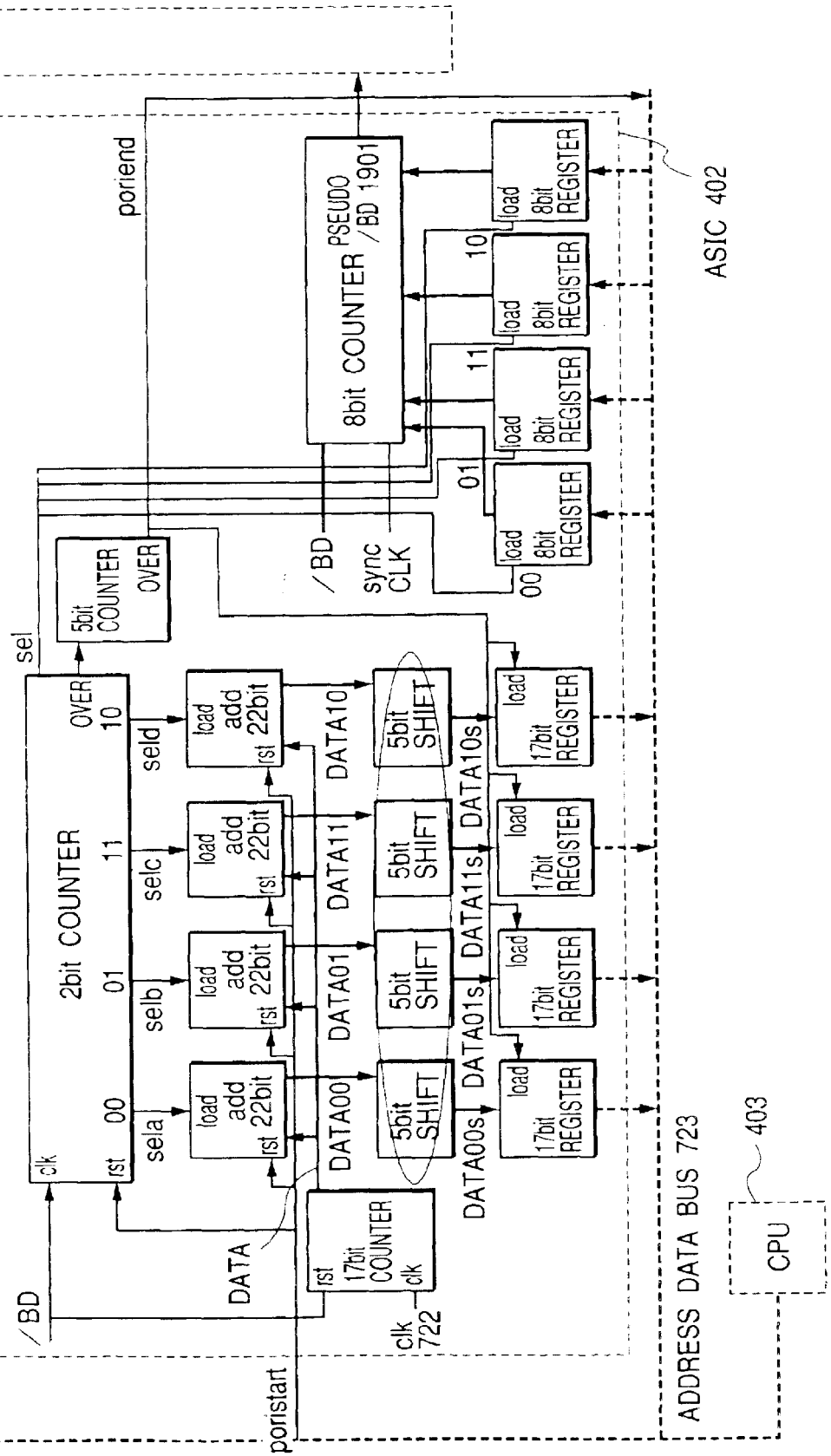

FIGS. 21A to 21C show a block diagram of the internal circuit of an ASIC 402. The difference of this circuit from that in the first embodiment is that there are three pseudo BD's, i.e., pseudo BD 1901 for cyan (C), pseudo BD 1902 for magenta (M) and pseudo BD 1903 for yellow (Y).

Figure 19:
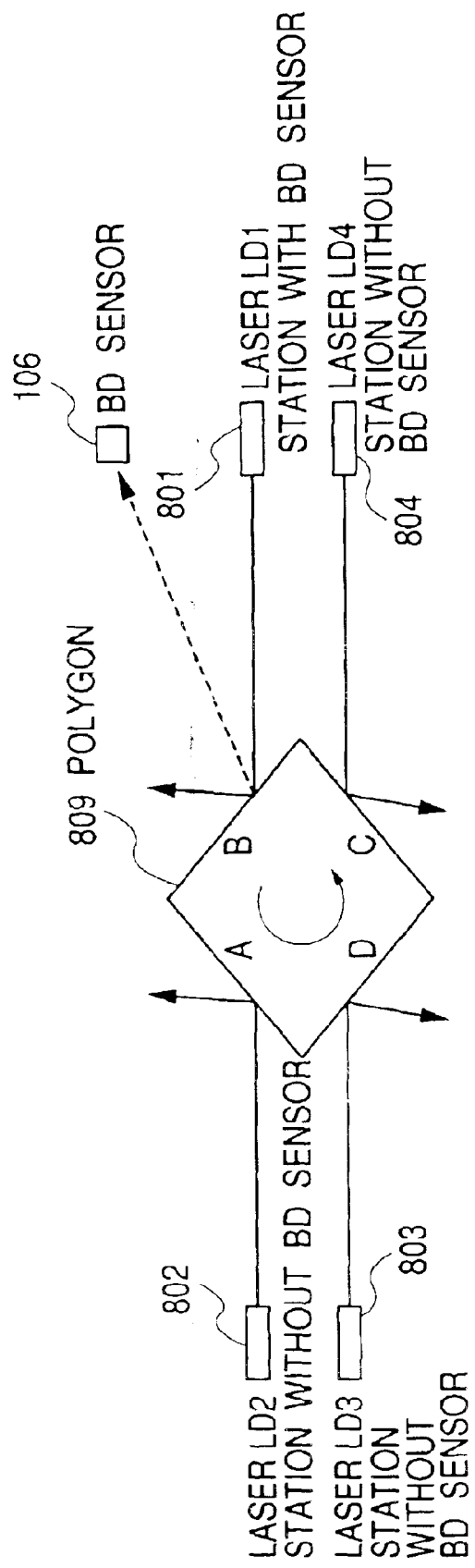
FIG. 19 shows the relation among a polygon, a laser and a BD sensor in the third embodiment.
Figure 20:
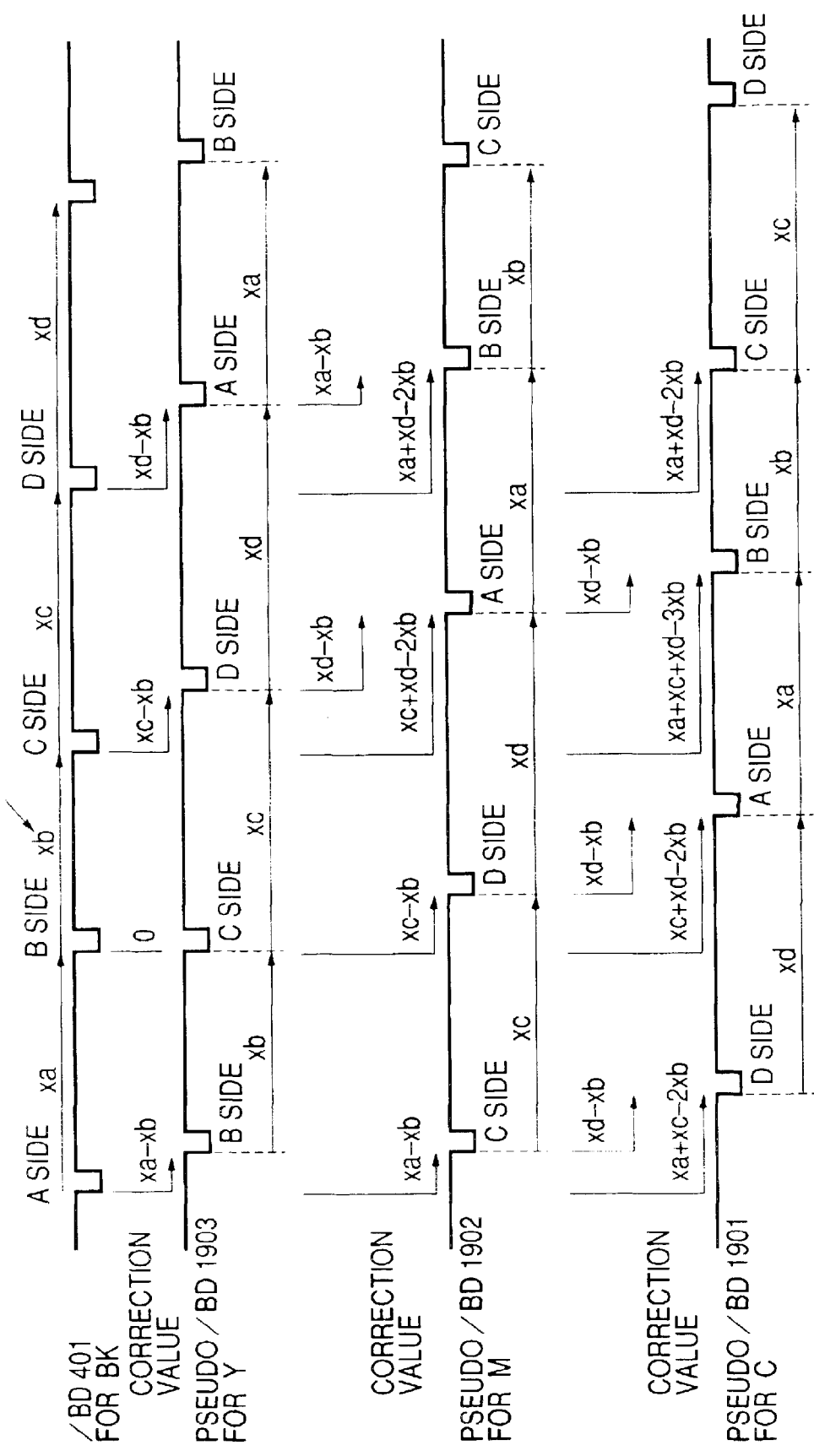
FIG. 20 is a timing chart for illustrating the operation of the third embodiment.

A method of calculating the correction value of each of four sides and a pseudo BD producing method will now be described with reference to the timing chart of FIG. 20 and FIG. 19 showing the relation among the polygon, the laser and the BD sensor.

The period of the A side of the /BD signal 401 of each side of the polygon 809 measured by the ASIC 402 is xa, the period of the B side is xb, the period of the C side is xc, and the period of the D side is xd. From the BD period of each side, the smallest one of the four periods is subtracted, and the resultant value is defined as a correction value.

This is because when the /BD signal side for black (BK) is using the A side, the pseudo /BD signal side for yellow (Y) uses the B side, the pseudo /BD signal side for magenta (M) uses the C side, and the pseudo /BD signal side for cyan (C) uses the D side, and When the /BD signal side for black (BK) is using the B side, the pseudo /BD signal side for yellow (Y) uses the C side, the pseudo /BD signal side for magenta (M) uses the D side, and the pseudo /BD signal side for cyan (C) uses the A side, and When the /BD signal side for black (BK) is using the C side, the pseudo /BD signal side for yellow (Y) uses the D side, the pseudo /BD signal side for magenta (M) uses the A side, and the pseudo /BD signal side for cyan (C) uses the B side, and When the /BD signal side for black (BK) is using the D side, the pseudo /BD signal side for yellow (Y) uses the A side, the pseudo /BD signal side for magenta (M) uses the B side, and the pseudo /BD signal side for cyan (C) uses the C side, and the correction values are determined from such correspondence between the /BD signal side and the pseudo /BD signal side.

Also, the correction values depend on the polygon and hardly vary with time and therefore, writing out from the /BD signal is constant. Also, the side of the polygon which is minimum in the BD period is determined as the correction value 0, whereby a reference side is determined.

A method of calculating the correction value of the pseudo BD signal 1903 for yellow (Y) will be shown below.

Assuming that the shortest BD period is xb, the correction value of the B side of the pseudo /BD signal 1903 for yellow (Y) corresponding to the A side of the /BD signal 401 side is (the period of the $A$ side of the $BD$ signal)−(the shortest $BD$ period)=$xa-xb$, the correction value is xa−xb;

the correction value of the C side of the pseudo /BD signal 1903 for yellow (Y) corresponding to the B side of the /BD signal 401 side is (the period of the *B* side of the *BD* signal)−(the shortest *BD* period)=*xb−xb*, the correction value is 0;

the correction value of the D side of the pseudo /BD signal 1903 for yellow (Y) corresponding to the C side of the BD signal 401 side is (the period of the *C* side of the *BD* signal)−(the shortest *BD* period)=*xc−xb*, the correction value is xc−xb;

the correction value of the A side of the pseudo /BD signal 1903 for yellow (Y) corresponding to the D side of the /BD signal 401 side is (the period of the *D* side of the *BD* signal)−(the shortest *BD* period)=*xd−xa*, the correction value is xd−xa.

Consequently, the pseudo /BD signal 1903 for yellow (Y) is as follows:

The correction value of the pseudo /BD signal for yellow (Y) of the /BD signal 401 of the A side is xa−xb and therefore, a pseudo /BD signal 1903 for yellow (Y) delayed by (xa−xb) clocks from the /BD signal 401 is produced and outputted.

The correction value of the pseudo /BD signal 1903 for yellow (Y) of the /BD signal 401 of the B side is 0 and therefore, the /BD signal 401 itself is produced and outputted as the pseudo /BD signal 1903 for yellow (Y).

The correction value of the pseudo /BD signal 1903 for yellow (Y) of the /BD signal 401 of the C side is xc−xb and therefore, a pseudo /BD signal 1903 for yellow delayed by (xc−xb) clocks form the /BD signal 401 is produced and outputted.

The correction value of the pseudo /BD signal 1903 for yellow (Y) of the /BD signal 401 of the D side is xd−xa and therefore, a pseudo /BD signal 1903 for yellow (Y) delayed by (xd−xa) clocks from the /BD signal 401 is produced and outputted.

As shown in FIG. 20, in the case of the /BD signal 401, a pseudo /BD signal 1903 for yellow is produced.

A method of calculating the correction value of the pseudo /BD signal 1902 for magenta (M) will be shown below.

The time difference between the B side of the pseudo /BD signal 1903 for yellow (Y) and the C side of the pseudo /BD signal 1902 for magenta (M) is 0, and the correction value of the A side of the /BD signal 401 and the B side of the pseudo /BD signal 1903 for yellow (Y) is xa−xb and therefore, the correction value of the C side of the pseudo /BD signal 1902 for magenta (M) corresponding to the A side of the /BD signal 401 side is 0+*xa−xb=xa−xb.*

The time difference between the C side of the pseudo /BD signal 1903 for yellow (Y) and the D side of the pseudo /BD signal 1902 for magenta (M) is xc−xb, and the correction value of the B side of the /BD signal 401 and the C side of the pseudo /BD signal 1903 for yellow (Y) is 0 and therefore, the correction value of the D side of the pseudo /BD signal 1902 for magenta (M) corresponding to the B side of the /BD signal 401 side is

*xc−xb+0=xc−xb.*

The time difference between the D side of the pseudo /BD signal 1903 for yellow (Y) and the A side of the pseudo /BD signal 1902 for magenta (M) is xd−xb, and the correction value of the C side of the /BD signal 401 and the D side of the pseudo /BD signal 1903 for yellow (Y) is xc−xb and therefore, the correction value of the A side of the pseudo /BD signal 1902 for magenta (M) corresponding to the C side of the /BD signal 401 side is

*xc−xb+xd−xb=xc+xd−2xb.*

The time difference between the A side of the pseudo /BD signal 1903 for yellow (Y) and the B side of the pseudo /BD signal 1902 for magenta (M) is xa−xb, and the correction value of the D side of the /BD signal 401 and the A side of the pseudo /BD signal 1903 for yellow (Y) is xd−xb, and therefore, the correction value of the B side of the pseudo /BD signal 1902 for magenta (M) corresponding to the D side of the /BD signal 401 side is

*xa−xb+xd−xb=xa+xd−2xb.*

Consequently, the pseudo /BD signal 1902 for magenta (M) is as follows:

The correction value of the pseudo /BD signal 1902 for magenta (M) of the /BD signal 401 of the A side is xa−xb and therefore, a pseudo /BD signal 1902 for magenta delayed by (xa−xb) clocks from the /BD signal 401 is produced and outputted.

The correction value of the pseudo /BD signal 1902 for magenta of the /BD signal 401 of the B side is xc−xb and therefore, a pseudo /BD signal 1902 for magenta delayed by (xc−xb) clocks from the /BD signal 401 is produced and outputted.

The correction value of the pseudo /BD signal 1902 for magenta (M) of the /BD signal 401 of the C side is xc+xd−2xb and therefore, a pseudo /BD signal 1902 for magenta (M) delayed by (xc+xd−2xb) clocks from the /BD signal 401 is produced and outputted.

The correction value of the pseudo /BD signal 1902 for magenta (M) of the /BD signal 401 of the D side is xa+xd−2xb and therefore, a pseudo /BD signal 1902 for magenta (M) delayed by (xa+xd−2xb) clocks from the /BD signal 401 is produced and outputted.

As shown in FIG. 20, in the case of the /BD signal 401, a pseudo /BD signal 1902 for magenta (M) is produced.

A method of calculating the correction value of the pseudo /BD signal 1901 for cyan (C) will be shown below.

The time difference between the C side of the pseudo /BD signal 1902 for magenta (M) and the D side of the pseudo /BD signal 1901 for cyan (C) is xc−xb, and the correction value of the A side of the /BD signal 401 and the C side of the pseudo /BD signal 1902 for magenta (M) is xa−xb and therefore, the correction value of the D side of the pseudo /BD signal 1901 for cyan (C) corresponding to the A side of the /BD signal 401 side is xc−xb+xa−xb=xa+xc−2xb.

The time difference between the D side of the pseudo /BD signal 1902 for magenta (M) and the A side of the pseudo /BD signal 1901 for cyan (C) is xd−xb, and the correction value of the B side of the /BD signal 401 and the D side of the pseudo /BD signal 1902 for magenta (M) is xc−xb and therefore, the correction value of the A side of the pseudo /BD signal 1901 for cyan (C) corresponding to the B side of the /BD signal 401 side is xd−xb+xc−xb=xc+xd−2xb.

The time difference between the A side of the pseudo /BD signal 1902 for magenta (M) and the B side of the pseudo /BD signal 1901 for cyan (C) is xa−xb, and the correction value of the C side of the /BD signal 401 and the A side of the pseudo /BD signal 1902 for magenta (M) is xc+xd−2xb and therefore, the correction value of the B side of the pseudo /BD signal 1901 for cyan (C) corresponding to the C side of the /BD signal 401 side is xa−xb+xc+xd−2xb=xa+xc+xd−3xb.

The time difference between the B side of the pseudo /BD signal 1902 for magenta (M) and the C side of the pseudo /BD signal 1901 for cyan (C) is 0, and the correction value of the D side of the /BD signal 401 and the B side of the pseudo /BD signal 1902 for magenta (M) is xa+xd−2xb and therefore, the correction value of the C side of the pseudo /BD signal 1901 for cyan (C) corresponding to the D side of the /BD signal 401 side is 0+xa+xd−2xb=xa+xd−2xb.

Consequently, the pseudo /BD signal 1901 for cyan (C) is as follows:

The correction value of the pseudo /BD signal 1901 for cyan (C) of the /BD signal 401 of the A side is xa+xc−2xb and therefore, a pseudo /BD signal 1901 for cyan (C) delayed by (xa+xc−2xb) clocks from the /BD signal 401 is produced and outputted.

The correction value of the pseudo /BD signal 1901 for cyan (C) of the /BD signal 401 of the B side is xc+xd−2xb and therefore, a pseudo /BD signal 1901 for cyan (C) delayed by (xc+xd−2xb) clocks from the /BD signal 401 is produced and outputted.

The correction value of the pseudo /BD signal 1901 for cyan (C) of the /BD signal 401 of the C side is xa+xc+xd−3xb and therefore, a pseudo /BD signal 1901 for cyan (C) delayed by (xa+xc+xd−3xb) clocks from the /BD signal 401 is produced and outputted.

The correction value of the pseudo /BD signal 1901 for cyan (C) of the /BD signal 401 of the D side is xa+xd−2xb and therefore, a pseudo /BD signal 1901 for cyan (C) delayed by (xa+xd−2xb) clocks from the /BD signal 401 is produced and outputted.

As shown in FIG. 20, in the case of the /BD signal 401, a pseudo /BD signal 1901 for cyan (C) is produced.

As described above, again in a scanning optical system having a polygon and four stations, as in the scanning optical system having a polygon and two stations, the BD period of each side of the polygon is measured, and a BD signal (pseudo BD signal) of a side without the BD sensor is produced form the BD period, whereby the side division error of the polygon can be eliminated.

According to the embodiments described above, there can be provided an image forming apparatus in which deflecting and scanning means (polygon mirrors) and laser beam detecting means (BD sensors) can be decreased to thereby achieve a reduction in cost and which is free of image misregister.

While the present invention has been described with respect to some preferred embodiments thereof, it is apparent that the present invention is not restricted to these embodiments, but various modifications and applications are possible within the scope of the invention as defined in the appended claims.

What is claimed is:

1. An image forming apparatus including:

a plurality of image bearing members;

an optical system having a plurality of light emitting elements suitable for generating light beams for scanning said image bearing members, a single polygon mirror suitable for deflecting the light beams generated from said plurality of light emitting elements onto said image bearing members, and a beam detector corresponding to at least one of said plurality of image bearing members, and for receiving the corresponding light beam scanned by said polygon mirror and producing a first synchronizing signal for recording an image on the relevant image bearing member;

a storing portion suitable for storing therein information regarding an error of each side of said polygon mirror; and a producing unit suitable for producing a second synchronizing signal for recording an image on the image bearing member not provided with said beam detector, by delaying the first synchronizing signal outputted from said beam detector, on the basis of a value of said storing portion.

2. An image forming apparatus according to claim 1, wherein said storing portion stores therein an amount of delay for each side of said polygon mirror.

3. An image forming apparatus according to claim 2, further including a calculating portion suitable for calculating said amount of delay by measuring an interval of the first synchronizing signal produced by said beam detector.

4. An image forming apparatus according to claim 3, wherein there exists a light beam scanned n sides before a side corresponding to the beam detector, and said calculating portion calculates said amount of delay by measuring the interval of the first synchronizing signal n sides after the first synchronizing signal.

5. An image forming apparatus according to claim 3, wherein said calculating portion calculates said amount of delay by calculating a difference between the interval of the synchronizing signal on each side and a minimum value of said interval.

6. An image forming apparatus according to claim 3, wherein said calculating portion executes said measuring operation a plurality of times, and calculates said amount of delay on the basis of an average value of those measurement values.

7. An image forming apparatus according to claim 3, wherein when the difference between the maximum value and minimum value of the value calculated by said calculating portion is greater than a predetermined value, the calculation by said calculating portion is executed again.

8. An image forming apparatus according to claim 1, having a plurality of said optical systems, and superimposing images of a plurality of colors one upon another to thereby form a color image.

9. An image forming apparatus according to claim 1, having four image bearing members and two optical systems, and wherein each of said optical systems forms images of two colors.

10. An image forming apparatus according to claim 1, having four image bearing members and one optical system, and wherein said optical system scans images of four colors.

11. An image forming apparatus according to claim 1, provided with a beam detector corresponding to the image bearing member for forming a black toner image.

12. An image forming apparatus according to claim 1, not provided with a beam detector corresponding to the image bearing member for forming a yellow toner image.

* * * * *